United States Patent
Takahashi et al.

(10) Patent No.: US 7,117,518 B1
(45) Date of Patent: Oct. 3, 2006

(54) INFORMATION RETRIEVAL METHOD AND APPARATUS

(75) Inventors: Yasushi Takahashi, Chiba (JP); Yoshihito Fujiwara, Kanagawa (JP); Kimiyoshi Yoshida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/078,469

(22) Filed: May 14, 1998

(51) Int. Cl.
   *H04N 5/445* (2006.01)
   *H04N 7/16* (2006.01)
   *H04N 7/173* (2006.01)
   *G06F 17/30* (2006.01)

(52) U.S. Cl. .................. 725/86; 725/13; 725/25; 725/39; 725/46; 725/97; 705/7; 705/10

(58) Field of Classification Search ........ 725/3–5, 725/32–36, 45–47, 97, 9–21, 39, 86; 705/7, 705/10
   See application file for complete search history.

(56) References Cited

U.S. PATENT DOCUMENTS

| | | | | |
|---|---|---|---|---|
| 4,745,549 A | * | 5/1988 | Hashimoto | 364/402 |
| 5,075,771 A | * | 12/1991 | Hashimoto | 358/84 |
| 5,351,075 A | * | 9/1994 | Herz et al. | 725/13 |
| 5,381,477 A | * | 1/1995 | Beyers, II et al. | 380/20 |
| 5,515,098 A | * | 5/1996 | Carles | 725/35 |
| 5,534,911 A | * | 7/1996 | Levitan | 348/1 |
| 5,594,509 A | * | 1/1997 | Florin et al. | 725/43 |
| 5,704,017 A | * | 12/1997 | Heckerman et al. | 706/12 |
| 5,754,939 A | * | 5/1998 | Herz et al. | 455/4.2 |
| 5,790,426 A | * | 8/1998 | Robinson | 702/179 |
| 5,790,935 A | * | 8/1998 | Payton | 725/91 |
| 5,798,785 A | * | 8/1998 | Hendricks et al. | 348/1 |
| 5,842,010 A | * | 11/1998 | Jain et al. | 707/104.1 |
| 5,848,396 A | * | 12/1998 | Gerace | 705/10 |
| 5,872,850 A | * | 2/1999 | Klein et al. | 380/49 |
| 5,884,282 A | * | 3/1999 | Robinson | 705/27 |
| 5,903,314 A | * | 5/1999 | Niijima et al. | 348/564 |
| 5,920,700 A | * | 7/1999 | Gordon et al. | 709/226 |
| 5,970,486 A | * | 10/1999 | Yoshida et al. | 707/4 |
| 5,973,397 A | * | 10/1999 | Low et al. | 257/698 |
| 5,990,927 A | * | 11/1999 | Hendricks et al. | 348/6 |
| 6,005,597 A | * | 12/1999 | Barrett et al. | 348/1 |
| 6,008,803 A | * | 12/1999 | Rowe et al. | 715/721 |
| 6,012,051 A | * | 1/2000 | Sammon et al. | 706/52 |

(Continued)

FOREIGN PATENT DOCUMENTS

JP          8077184      *  3/1996

(Continued)

OTHER PUBLICATIONS

Patent Abstracts of Japan, publication No. 06-348761 dated Dec. 22, 1994.

(Continued)

*Primary Examiner*—Chris Kelley
*Assistant Examiner*—Son P. Huynh
(74) *Attorney, Agent, or Firm*—Frommer Lawrence & Haug LLP; William S. Frommer; Thomas F. Presson

(57) ABSTRACT

In an information retrieval method and apparatus, a specific user model is formed for a specific user based at least upon the specific user's own selection data. A plurality of specific user models formed for respective users are registered, and a group user model is formed on the basis of the plurality of specific user models. Information is subsequently retrieved based on the group user model. The group user model may be formed by selecting a maximum, minimum or average value of the plurality of specific user models.

21 Claims, 36 Drawing Sheets

U.S. PATENT DOCUMENTS

| | | | | |
|---|---|---|---|---|
| 6,028,599 | A * | 2/2000 | Yuen et al. | 725/50 |
| 6,029,176 | A * | 2/2000 | Cannon | 707/104.1 |
| 6,041,311 | A * | 3/2000 | Chislenko et al. | 705/27 |
| 6,049,777 | A * | 4/2000 | Sheena et al. | 705/10 |
| 6,064,980 | A * | 5/2000 | Jacobi et al. | 705/26 |
| 6,073,112 | A * | 6/2000 | Geerlings | 705/14 |
| 6,078,740 | A * | 6/2000 | DeTreville | 395/500.43 |
| 6,088,722 | A * | 7/2000 | Herz et al. | 709/217 |
| 6,092,049 | A * | 7/2000 | Chislenko et al. | 705/10 |
| 6,108,706 | A * | 8/2000 | Birdwell et al. | 709/229 |
| 6,112,181 | A * | 8/2000 | Shear et al. | 705/1 |
| 6,112,186 | A * | 8/2000 | Bergh et al. | 705/10 |
| 6,172,674 | B1 * | 1/2001 | Etheredge | 715/721 |
| 6,173,330 | B1 * | 1/2001 | Guo et al. | 709/232 |
| 6,236,978 | B1 * | 5/2001 | Tuzhilin | 705/26 |
| 6,286,005 | B1 * | 9/2001 | Cannon | 707/100 |
| 6,298,482 | B1 * | 10/2001 | Seidman et al. | 725/101 |
| 6,314,467 | B1 * | 11/2001 | Hirasawa et al. | 709/236 |
| 6,469,753 | B1 * | 10/2002 | Klosterman et al. | 348/552 |
| 6,487,723 | B1 * | 11/2002 | MacInnis | 725/132 |
| 6,539,548 | B1 * | 3/2003 | Hendricks et al. | 725/109 |
| 6,583,825 | B1 * | 6/2003 | Yuen et al. | 348/731 |
| 2005/0278741 | A1 * | 12/2005 | Robarts et al. | 725/46 |

FOREIGN PATENT DOCUMENTS

JP   408077184 A * 3/1996

OTHER PUBLICATIONS

Patent Abstracts of Japan, publication No. 08-006958 dated Jan. 12, 1996.

Patent Abstracts of Japan, publication No. 05-316185 dated Nov. 26, 1993.

Haruko Shiba, Mikiya Tani, Shunji Ichiyama, Kansai C&C Research Labs., NEC Corp. A book search system reflecting a personal taste.

Patent Abstracts of Japan, publication No. 06-124309 dated May 6, 1994.

Patent Abstracts of Japan, publication No. 08-016606 dated Jan. 19, 1996.

* cited by examiner

| AVERAGE | | BREAKFAST | LUNCH | DINNER | RELAXATION ON WEEKDAYS | RELAXATION ON HOLIDAYS |
|---|---|---|---|---|---|---|
| | GENRE | | | | | |
| AGE | | AUDIENCE RATING DATA OF GENRE FOR EACH LIFE SCENE DIVIDED ACCORDING TO AGE AND SEX(%) | | | | |

| AVERAGE | | BREAKFAST | LUNCH | DINNER | RELAXATION ON WEEKDAYS | RELAXATION ON HOLIDAYS |
|---|---|---|---|---|---|---|
| | GENRE | | | | | |
| LIFE STAGE | | AUDIENCE RATING DATA OF GENRE FOR EACH LIFE SCENE DIVIDED ACCORDING TO LIFE STAGE(%) | | | | |

| AVERAGE | | BREAKFAST | LUNCH | DINNER | RELAXATION ON WEEKDAYS | RELAXATION ON HOLIDAYS |
|---|---|---|---|---|---|---|
| | GENRE | | | | | |
| FACTOR | | AUDIENCE RATING DATA OF GENRE FOR EACH LIFE SCENE DIVIDED ACCORDING TO FACTOR AXIS(%) | | | | |

| TEENS-MALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 53.8 | 51.6 | 2.2 | 0 | 0 | 0 | 0 | 0 | 0 | 0 |
| LUNCH | 100 | 17.6 | 3.3 | 0 | 9.9 | 3.3 | 0 | 0 | 0 | 0 | 1.1 |
| DINNER | 100 | 67.1 | 24.2 | 0 | 23.1 | 4.4 | 2.2 | 1.1 | 1.1 | 0 | 11 |
| RELAXATION ON WEEKDAYS | 100 | 33 | 1.1 | 0 | 15.4 | 7.7 | 2.2 | 0 | 1.1 | 0 | 5.5 |
| RELAXATION ON HOLIDAYS | 100 | 29.7 | 0 | 3.3 | 14.3 | 4.4 | 3.3 | 0 | 0 | 0 | 4.4 |

| TWENTIES-MALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 66.6 | 64.4 | 1.1 | 1.1 | 0 | 0 | 0 | 0 | 0 | 0 |
| LUNCH | 100 | 36.6 | 12.2 | 0 | 20 | 4.4 | 0 | 0 | 0 | 0 | 0 |
| DINNER | 100 | 73.3 | 30 | 2.2 | 30 | 8.9 | 1.1 | 1.1 | 0 | 0 | 0 |
| RELAXATION ON WEEKDAYS | 100 | 56.6 | 3.3 | 7.8 | 23.3 | 16.7 | 1.1 | 0 | 1.1 | 0 | 3.3 |
| RELAXATION ON HOLIDAYS | 100 | 35.5 | 2.2 | 5.6 | 16.7 | 1.1 | 4.4 | 1.1 | 1.1 | 1.1 | 2.2 |

| THIRTIES-MALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 59.7 | 58.7 | 0 | 0 | 0 | 0 | 0 | 0 | 0 | 1 |
| LUNCH | 100 | 37.5 | 25 | 0 | 9.6 | 2.9 | 0 | 0 | 0 | 0 | 0 |
| DINNER | 100 | 73.1 | 46.2 | 1.9 | 11.5 | 9.6 | 1 | 0 | 1 | 0 | 1.9 |
| RELAXATION ON WEEKDAYS | 100 | 59.7 | 18.3 | 9.6 | 18.3 | 7.7 | 2.9 | 1 | 0 | 0 | 1.9 |
| RELAXATION ON HOLIDAYS | 100 | 52 | 4.8 | 17.3 | 13.5 | 4.8 | 8.7 | 1.9 | 1 | 0 | 0 |

| FORTIES-MALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 54.3 | 53.5 | 0 | 0.8 | 0 | 0 | 0 | 0 | 0 | 0 |
| LUNCH | 100 | 38.6 | 21.3 | 0 | 15.7 | 1.6 | 0 | 0 | 0 | 0 | 0 |
| DINNER | 100 | 65.4 | 37 | 5.5 | 13.4 | 1.6 | 2.4 | 1.6 | 0 | 0 | 3.9 |
| RELAXATION ON WEEKDAYS | 100 | 63.8 | 22.8 | 8.7 | 10.2 | 3.9 | 15 | 2.4 | 0.8 | 0 | 0 |
| RELAXATION ON HOLIDAYS | 100 | 46.6 | 6.3 | 15 | 7.1 | 0.8 | 14.2 | 2.4 | 0 | 0 | 0.8 |

(%)

| FIFTIES-MALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 58.3 | 57.1 | 0 | 0 | 1.2 | 0 | 0 | 0 | 0 | 0 |
| LUNCH | 100 | 39.3 | 29.8 | 0 | 9.5 | 0 | 0 | 0 | 0 | 0 | 0 |
| DINNER | 100 | 66.7 | 60.7 | 0 | 2.4 | 2.4 | 0 | 0 | 0 | 0 | 1.2 |
| RELAXATION ON WEEKDAYS | 100 | 52.5 | 17.9 | 10.7 | 4.8 | 6 | 7.1 | 4.8 | 1.2 | 0 | 0 |
| RELAXATION ON HOLIDAYS | 100 | 46.5 | 8.3 | 15.5 | 4.8 | 2.4 | 10.7 | 2.4 | 2.4 | 0 | 0 |

| SIXTIES-MALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 58.4 | 51.2 | 0 | 0 | 6 | 0 | 1.2 | 0 | 0 | 0 |
| LUNCH | 100 | 51.2 | 33.3 | 0 | 6 | 8.3 | 1.2 | 1.2 | 0 | 1.2 | 0 |
| DINNER | 100 | 58.5 | 40.5 | 3.6 | 3.6 | 2.4 | 2.4 | 2.4 | 1.2 | 1.2 | 1.2 |
| RELAXATION ON WEEKDAYS | 100 | 33.4 | 9.5 | 4.8 | 3.6 | 4.8 | 8.3 | 2.4 | 0 | 0 | 0 |
| RELAXATION ON HOLIDAYS | 100 | 34.6 | 7.1 | 13.1 | 4.8 | 4.8 | 3.6 | 1.2 | 0 | 0 | 0 |

| TEENS-FEMALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 62.8 | 58.5 | 1.1 | 0 | 0 | 0 | 0 | 0 | 1.1 | 2.1 |
| LUNCH | 100 | 19.2 | 2.1 | 0 | 12.8 | 4.3 | 0 | 0 | 0 | 0 | 0 |
| DINNER | 100 | 62.7 | 19.1 | 0 | 26.6 | 9.6 | 0 | 0 | 0 | 0 | 7.4 |
| RELAXATION ON WEEKDAYS | 100 | 43.7 | 1.1 | 0 | 13.8 | 22.3 | 4.3 | 0 | 1.1 | 0 | 1.1 |
| RELAXATION ON HOLIDAYS | 100 | 33 | 0 | 0 | 17 | 6.4 | 4.3 | 0 | 3.2 | 0 | 2.1 |

| TWENTIES-FEMALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 59.1 | 52.4 | 0 | 0 | 1.9 | 0 | 0 | 0 | 0 | 4.8 |
| LUNCH | 100 | 50.5 | 7.6 | 0 | 36.2 | 5.7 | 0 | 0 | 0 | 1 | 0 |
| DINNER | 100 | 67.9 | 24.8 | 0 | 24.8 | 8.6 | 1 | 1 | 1 | 0 | 6.7 |
| RELAXATION ON WEEKDAYS | 100 | 52.4 | 7.6 | 1.9 | 15.2 | 21.9 | 4.8 | 0 | 0 | 0 | 1 |
| RELAXATION ON HOLIDAYS | 100 | 32.5 | 2.9 | 1.9 | 18.1 | 4.8 | 3.8 | 1 | 0 | 0 | 0 |

| THIRTIES-FEMALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 66.1 | 61.2 | 0 | 1 | 1 | 0 | 0 | 0 | 0 | 2.9 |
| LUNCH | 100 | 63.1 | 22.3 | 1 | 34 | 5.8 | 0 | 0 | 0 | 0 | 0 |
| DINNER | 100 | 64.1 | 29.1 | 0 | 14.6 | 6.8 | 0 | 0 | 0 | 0 | 13.6 |
| RELAXATION ON WEEKDAYS | 100 | 56.3 | 10.7 | 2.9 | 16.5 | 15.5 | 3.9 | 0 | 1 | 1.9 | 3.9 |
| RELAXATION ON HOLIDAYS | 100 | 44.8 | 3.9 | 3.9 | 15.5 | 11.7 | 6.8 | 1 | 1 | 0 | 1 |
| | | | | | | | | | | | (%) |

FIG. 9A

| FORTIES-FEMALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 61.6 | 60.7 | 0 | 0 | 0.9 | 0 | 0 | 0 | 0 | 0 |
| LUNCH | 100 | 60.7 | 28 | 0 | 24.3 | 4.7 | 0.9 | 0 | 0 | 2.8 | 0 |
| DINNER | 100 | 61.6 | 33.6 | 0 | 19.6 | 5.6 | 0 | 0 | 0.9 | 0 | 1.9 |
| RELAXATION ON WEEKDAYS | 100 | 38.2 | 6.5 | 0.9 | 11.2 | 15.9 | 0.9 | 0 | 1.9 | 0.9 | 0 |
| RELAXATION ON HOLIDAYS | 100 | 36.5 | 2.8 | 1.9 | 15 | 7.5 | 6.5 | 0.9 | 1.9 | 0 | 0 |
| | | | | | | | | | | | (%) |

| FIFTIES-FEMALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 62 | 57 | 0 | 0 | 5 | 0 | 0 | 0 | 0 | 0 |
| LUNCH | 100 | 63 | 37 | 0 | 15 | 8 | 0 | 0 | 1 | 2 | 0 |
| DINNER | 100 | 63 | 49 | 1 | 7 | 5 | 0 | 0 | 1 | 0 | 0 |
| RELAXATION ON WEEKDAYS | 100 | 41 | 10 | 0 | 5 | 16 | 3 | 2 | 2 | 3 | 0 |
| RELAXATION ON HOLIDAYS | 100 | 41 | 5 | 6 | 5 | 12 | 4 | 5 | 3 | 1 | 0 |

| SIXTIES-FEMALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 57.5 | 54.3 | 0 | 0 | 2.1 | 0 | 0 | 1.1 | 0 | 0 |
| LUNCH | 100 | 63.8 | 36.2 | 0 | 7.4 | 12.8 | 0 | 2.1 | 0 | 5.3 | 0 |
| DINNER | 100 | 58.6 | 39.4 | 2.1 | 5.3 | 6.4 | 0 | 1.1 | 3.2 | 0 | 1.1 |
| RELAXATION ON WEEKDAYS | 100 | 39.4 | 11.7 | 2.1 | 4.3 | 17 | 2.1 | 1.1 | 1.1 | 0 | 0 |
| RELAXATION ON HOLIDAYS | 100 | 44.7 | 3.2 | 5.3 | 6.4 | 17 | 10.6 | 0 | 1.1 | 1.1 | 0 |

(%)

| CLUSTER 1 | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 58.2 | 55.3 | 0.4 | 0 | 1.7 | 0 | 0 | 0 | 0 | 0.8 |
| LUNCH | 100 | 43.8 | 16.9 | 0 | 21.1 | 4.6 | 0 | 0.4 | 0 | 0.8 | 0 |
| DINNER | 100 | 65.8 | 36.3 | 0.8 | 16 | 5.5 | 1.3 | 0 | 0.4 | 0 | 5.5 |
| RELAXATION ON WEEKDAYS | 100 | 57.1 | 11.8 | 6.8 | 16.5 | 13.5 | 3 | 1.7 | 1.7 | 0.4 | 1.7 |
| RELAXATION ON HOLIDAYS | 100 | 42.7 | 2.1 | 11.4 | 13.5 | 7.2 | 3.8 | 1.3 | 1.3 | 0.4 | 1.7 |

| AVERAGE | GENRE |
|---|---|
| AGE | "WEEKLY AUDIENCE RATING DATA DIVIDED ACCORDING TO AGE AND SEX(%)" |

FIG. 13A

| AVERAGE | GENRE |
|---|---|
| AGE | "OFTEN-WATCHED PICTURE DIVIDED ACCORDING TO AGE AND SEX(%)" |

FIG. 13B

| | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|
| AVERAGE FOR EACH AGE AND SEX | 100 | 96 | 74.2 | 75.3 | 65.2 | 84.7 | 53.4 | 59.3 | 62 | 38.6 |
| TEENS-MALE | 100 | 86.8 | 75.8 | 86.8 | 68.1 | 91.2 | 46.2 | 78 | 31.9 | 69.2 |
| TWENTIES-MALE | 100 | 94.4 | 75.6 | 85.6 | 66.7 | 88.9 | 52.2 | 71.1 | 45.6 | 45.6 |
| THIRTIES-MALE | 100 | 97.1 | 85.6 | 77.9 | 52.9 | 87.5 | 51.9 | 49 | 52.9 | 47.1 |
| FORTIES-MALE | 100 | 98.4 | 91.3 | 62.2 | 38.6 | 85 | 57.5 | 44.9 | 59.1 | 29.1 |
| FIFTIES-MALE | 100 | 98.8 | 85.7 | 50 | 39.3 | 78.6 | 48.8 | 39.3 | 60.7 | 9.5 |
| SIXTIES-MALE | 100 | 100 | 88.1 | 63.1 | 58.3 | 86.9 | 48.8 | 40.5 | 69 | 11.9 |
| TEENS-FEMALE | 100 | 92.6 | 73.4 | 94.7 | 93.6 | 95.7 | 57.4 | 85.1 | 58.5 | 69.1 |
| TWENTIES-FEMALE | 100 | 96.2 | 68.6 | 89.5 | 81.9 | 84.8 | 49.5 | 67.6 | 64.8 | 54.3 |
| THIRTIES-FEMALE | 100 | 96.1 | 56.3 | 82.5 | 74.8 | 81.6 | 58.3 | 70.9 | 69.9 | 71.8 |
| FORTIES-FEMALE | 100 | 98.1 | 59.8 | 75.7 | 68.2 | 83.2 | 55.1 | 55.1 | 69.2 | 26.2 |
| FIFTIES-FEMALE | 100 | 96 | 64 | 65 | 71 | 73 | 55 | 53 | 80 | 14 |
| SIXTIES-FEMALE | 100 | 96.8 | 66 | 69.1 | 73.4 | 80.9 | 57.4 | 59.6 | 79.8 | 10.6 |

| AVERAGE | GENRE |
|---|---|
| LIFE STAGE | "WEEKLY AUDIENCE RATING DATA DIVIDED ACCORDING TO LIFE STAGE(%)" |

FIG. 15A

| AVERAGE | GENRE |
|---|---|
| LIFE STAGE | "OFTEN-WATCHED PICTURE DIVIDED ACCORDING TO LIFE STAGE(%)" |

FIG. 15B

| AVERAGE | GENRE |
|---|---|
| FACTOR | "WEEKLY AUDIENCE RATING DATA DIVIDED ACCORDING TO FACTOR AXIS(%)" |

FIG. 16A

| AVERAGE | GENRE |
|---|---|
| FACTOR | "OFTEN-WATCHED PICTURE DIVIDED ACCORDING TO FACTOR AXIS(%)" |

FIG. 16B

| AVERAGE | GENRE |
|---|---|
| CLUSTER | "WEEKLY AUDIENCE RATING DATA DIVIDED ACCORDING TO ATTITUDE VALUE CLUSTER(%)" |

FIG. 16C

| AVERAGE | GENRE |
|---|---|
| CLUSTER | "OFTEN-WATCHED PICTURE DIVIDED ACCORDING TO ATTITUDE VALUE CLUSTER(%)" |

FIG. 16D

| | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|
| CLUSTER AVERAGE | 100 | 96 | 74.2 | 75.3 | 65.2 | 84.7 | 53.4 | 59.3 | 62 | 38.6 |
| CLUSTER 1 | 100 | 97.9 | 82.7 | 84.8 | 69.2 | 86.1 | 54.4 | 61.6 | 53.2 | 41.4 |
| CLUSTER 2 | 100 | 98.6 | 84.1 | 71 | 34.8 | 76.8 | 59.4 | 42 | 53.6 | 33.3 |
| CLUSTER 3 | 100 | 97 | 76.2 | 71.3 | 62.4 | 90.1 | 63.4 | 44.6 | 67.3 | 39.6 |
| CLUSTER 4 | 100 | 98.3 | 62.7 | 74.6 | 70.3 | 89 | 55.9 | 61.9 | 74.6 | 33.9 |
| CLUSTER 5 | 100 | 95.2 | 82.2 | 95.2 | 90.4 | 97.3 | 61.6 | 87.7 | 65.1 | 61.6 |
| CLUSTER 6 | 100 | 98.3 | 62 | 50.4 | 43.8 | 72.7 | 45.5 | 47.9 | 58.7 | 22.3 |
| CLUSTER 7 | 100 | 96.2 | 65.2 | 78.8 | 68.9 | 84.1 | 46.2 | 66.7 | 63.6 | 36.4 |
| CLUSTER 8 | 100 | 92.2 | 82.4 | 80.4 | 52.9 | 64.7 | 31.4 | 62.7 | 45.1 | 43.1 |

SELECT EACH APPLICABLE ITEM WITH A CURSOR AND PUSH THE DETERMINATION BUTTON.

AGE: ○NINETEEN OR BELOW, ○TWENTIES, ●THIRTIES, ○FORTIES, ○FIFTIES, ○SIXTY AND OVER

SEX: ○MALE, ○FEMALE

○END

SELECT EACH APPLICABLE ITEM WITH A CURSOR AND PUSH THE DETERMINATION BUTTON.

OCCUPATION: ○JUNIOR AND SENIOR HIGH SCHOOL STUDENTS, ○COLLEGE STUDENTS, ○EMPLOYEE, ○SELF-EMPLOYEE, ○HOUSEWIFE, ○UNEMPLOYED

MARRIAGE: ○MARRIED, ○UNMARRIED

CHILDREN: ○NO
○YES ─┬─ ○INFANT
      ├─ ○STUDENT
      └─ ○EMPLOYED

○END

WHICH OF THE TYPES DO YOU CLOSE TO ? SELECT EACH APPLICABLE CIRCLE.

| Left description | Slider | Right description |
|---|---|---|
| YOU ARE AFFIRMATIVE TO TV. YOU PARTICIPATES A PROGRAM POSITIVELY AND REACTS. YOU WATCH INTERACTIVELY WITH EVERYONE. | UNDECIDED | IT IS A WASTE OF TIME TO WATCH TV. THERE ARE MANY WORTHLESS PROGRAMS. |
| TV IS USEFUL IN KNOWLEDGE EDUCATION. NEWS, DOCUMENTARY, AND SPORTS ARE GOOD. | UNDECIDED | YOU LIKE MERRY PROGRAMS. YOU WATCH TV UNRESTRICTEDLY AND WASTE YOUR TIME. |
| TV IS YOUR ESSENTIAL FUN AND AMUSEMENT. TV IS THE BEST FOR A CHANGE. | UNDECIDED | IT MIGHT BE BETTER NOT TO WATCH TV. YOU WATCH TV ONLY FOR A FREE TIME AND DO NOT CARE IF YOU HAVE NO TV. |
| YOU WATCH TV UNRESTRICTEDLY. YOU CAN NOT STOP ONCE YOU START. YOU WATCH TV TO BE PICKLED IN IT AND ZAP IT A LOT. | UNDECIDED | YOU WATCH ONLY A DESIRED PROGRAM. YOU WATCH TV ONLY FOR A VERY FREE TIME. |

WHICH OF THE TYPES DO YOU CLOSE TO ? SELECT EACH APPLICABLE CIRCLE.

| | |
|---|---|
| YOU WANT TO WATCH A POPULAR PROGRAM. A SPECIAL PROGRAM IS INTERESTING. | TV IS NOT NECESSARY. THERE ARE MANY WORTHLESS PROGRAMS RECENTLY. |
| YOU HAVE NOT SO MANY PROGRAMS YOU ALWAYS WATCH. YOU PREFER A PROGRAM WITHOUT A STORY. | YOU HAVE PROGRAMS YOU ALWAYS WATCH. YOU PREFER A PROGRAM WITH A STORY. |
| YOU LIKE AN EASY PROGRAM WITHOUT A STORY. YOU LIKE TO WATCH A COMEDY LAUGHINGLY. YOU LIKE A LIGHT AND CHEERFUL PROGRAM. | YOU LIKE A LONG-TERM DRAMA AND STORY. YOU ARE IMPRESSED BY A DRAMA AND MOVIE AND SYMPATHIZE WITH THE CHARACTERS. YOU ARE DEEPLY IMPRESSED. |
| YOU WATCH TV MOSTLY ALONE. YOU TRY TO WATCH ONLY A DESIRED PROGRAM. | YOU WATCH TV MOSTLY WITH YOUR FAMILY. YOU WATCH TV HAPPILY. |

Sliders: UNDECIDED (between each pair)

FIG. 23B

| WHICH OF THE TYPES DO YOU CLOSE TO ? SELECT ONE FROM THE TYPES 1 TO 8. | |
|---|---|
| 1. BALANCED GROUP | YOU ARE STANDARD AUDIENCE.<br>YOU ARE SLIGHTLY AFFIRMATIVE TO TV, WATCH UNRESTRICTEDLY, AND PREFER AN EASY PROGRAM WITHOUT STORY. |
| 2. UNRESTRICTEDLY ZAPPING GROUP | YOU WATCH TV UNRESTRICTEDLY AND ZAPS A LOT.<br>YOU PREFER AN EASY PROGRAM WITHOUT STORY.<br>YOU ARE NEGATIVE TO TV COMPARATIVELY. |
| 3. UNRESTRICTED GROUP | YOU WATCH TV UNRESTRICTEDLY AND CAN NOT STOP ONCE YOU START.<br>YOU DO NOT PARTICIPATE IN TV POSITIVELY.<br>YOU PREFER A PROGRAM WITH A STORY AND DRAMA COMPARATIVELY. |
| 4. ABSORBED IN STORY PROGRAM GROUP | YOU PREFER AN IMPRESSION WITH A STORY AND DRAMA.<br>YOU DO NOT PARTICIPATE IN TV POSITIVELY.<br>YOU WATCH TV RESTRICTEDLY COMPARATIVELY. |
| 5. TV IS MY FRIEND GROUP | YOU PARTICIPATE IN TV POSITIVELY AND ENJOY WITH EVERYONE.<br>YOU PREFER AN IMPRESSIVE PROGRAM WITH A STORY AND DRAMA.<br>YOU HAVE A TENDENCY TO WATCH TV UNRESTRICTEDLY. |
| 6. ANTI-TV GROUP | YOU ARE NEGATIVE TO TV.<br>YOU SELECT A DESIRED PROGRAM.<br>YOU WATCH AN EASY PROGRAM WITHOUT A STORY COMPARATIVELY. |
| 7. BUSY GROUP | YOU SELECT A SPECIALLY DESIRED PROGRAM.<br>YOU ARE AFFIRMATIVE TO TV COMPARATIVELY AND PARTICIPATE IN TV.<br>YOU WATCH REGARDLESS OF A PROGRAM TYPE. |
| 8. LAUGHTER GROUP | YOU PREFER AN EASY AND COMFORTABLE PROGRAM WITHOUT STORY.<br>YOU ARE AFFIRMATIVE TO TV AND PARTICIPATE POSITIVELY.<br>YOU SELECT A COMPARATIVELY DESIRED PROGRAM. |

FIG. 24

| GENRE | AVERAGE | BREAKFAST | LUNCH | DINNER | RELAXATION ON WEEKDAYS | RELAXATION ON HOLIDAYS |
|---|---|---|---|---|---|---|
| "AUDIENCE RATING OF GENRE DIVIDED ACCORDING TO LIFE SCENE." | | | | | | |

NOTE: M IS AN IDENTIFICATION KEY INDICATING SEX OF MALE.

| THIRTIES-MALE (30. 1. M) | | | | | | |
|---|---|---|---|---|---|---|
| TWENTIES-MALE (20. 1. M) | AVERAGE | BREAKFAST | LUNCH | DINNER | RELAXATION ON WEEKDAYS | RELAXATION ON HOLIDAYS |
| GENRE | | | | | | |

"AUDIENCE RATING OF GENRE FOR EACH LIFE SCENE DIVIDED ACCORDING TO AGE AND SEX."

CLUSTER ⑤ RECOMMENDATORY PROGRAMS/TITLE LIST  NOVEMBER 22(FRI.)
10:00PM

THE ×××
YOU WIN A PRIZE OF FOREIGN WORLD TRAVELING AT LAST ?

△△ SHOW
YOU CAN NOT MISS THIS WEEK'S ○○ !

○○○
THE GRANDSTORY OF THE FIRST LOCATION OF ×× IN A DRAMA!!

"×××" '93 ○○ DIRECTOR
THE SCHOOL PICTURE FOR YOUNG FROM ○○ DIRECTOR.

JAPANESE MUSIC TOP 10 "△△△"
××× WILL CONTINUE TO BE ON THE TOP THIS WEEK ?

VOL. 4 ○○
THAT △△ RUNS THROUGH THE KARAOKE FIELD LIKE A STORM !?

☐ MEMBER PROFILE REGISTRATION

1) INPUT YOUR MEMBER NUMBER WITH NUMERAL KEYS.

MEMBER NUMBER ☐ ☐ ☐ ☐ #

2) SELECT YOUR APPLICABLE ITEMS WITH A CURSOR AND PUSH THE DETERMINATION KEY.

AGE : ·········
   SEX : ············

GROUP REGISTRATION

1) INPUT YOUR GROUP ID NUMBER WITH NUMERAL KEYS.

GROUP ID NUMBER  [*] [ ] [ ] [ ] [#]

2) INPUT YOUR MEMBER NUMBER OF GROUP SUCCESSIVELY WITH NUMERAL KEYS.

MEMBER NUMBER  [ ] [ ] [ ] [ ] [#]

3) PUSH THE DETERMINATION KEY.

FIG. 35A

GROUP REGISTRATION CHECK

4) CHECK THE GROUP LIST.

| GROUP ID NUMBER | | | |
|---|---|---|---|
| | | | *1 2 3 4 |
| MEMBER ID NUMBER | No. 1) | 5 6 7 8 | TARO KIMURA |
| | No. 2) | 9 0 1 2 | JIRO OTA |
| | No. 3) | 3 4 5 6 | HANAKO SUZUKI |
| | No. 4) | 7 8 9 0 | KEIKO TAKAHASHI |
| | No. 5) | 2 3 4 5 | SABURO OGAWA |
| | No. 6) | 6 7 8 9 | JUNKO OMIYA |

5) IF THE LIST IS CORRECT, PUSH THE "EXECUTION" BUTTON.
   IF THE LIST IS MODIFIED, SELECT THE MEMBER NUMBER WITH A CURSOR AND PUSH THE "EXECUTION" BUTTON, SO AS TO RETURN TO 2).

FIG. 35B

INFORMATION RETRIEVAL METHOD AND APPARATUS

BACKGROUND OF THE INVENTION

1. Field of the Invention

This invention relates to an information retrieval method and apparatus, and more particularly, in applicable to a program retrieval method and apparatus for retrieving a program desired to be watched by an audience among from a large number of television programs which are transmitted via a broadcasting satellite.

2. Description of the Related Art

In a satellite broadcasting system in which television programs are transmitted to an audience via a broadcasting satellite, a television signal is digitized and a large number of programs are transmitted at the same time. Such a system increases the number of programs from which an audience may select.

Moreover, in a system for providing various information from a host computer to computer terminals through the telephone line or an exclusive line, a user at a terminal side selects desired information from among a large amount of information. The information is requested from the host computer side.

When an audience or a user tries to select a television program or the information on a computer, there is a problem that the retrieval operation of the audience or user becomes complicated. That is, since a desired program or information must be retrieved from among a large number of programs or information it is difficult to select a desired program or information easily.

SUMMARY OF THE INVENTION

In view of the foregoing, an object of this invention is to provide an information retrieval method and apparatus which is capable of easily retrieving a necessary information for an personal or grouped audience or user.

The foregoing object and other objects of the invention have been achieved by the provision of an information retrieval method and apparatus. In the information retrieval method and apparatus, a specific user model of a specific user's own is formed based on the general user selection taste data consisting of classification items and contents of information on the basis of the general user group classified by a user attribute and/or the state of information utilization, and based on the basic information selection taste data of a specific user; the specific user models formed for every plural users are registered so as to correspond to users respectively; and information conforming to one or plural specific user models is retrieved based on one or plural specific user models among from plural user models.

According to this invention, in the information retrieval method and apparatus, the general user selection taste data is corrected by the basic selection taste data of a specific user, and the selection taste data of a group consisting of a plurality of users is formed by the plural basic selection taste data which is respectively obtained correspondingly to plural specific users, so that the information conforming to the group's own characteristics is retrieved.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 4A to 4C are schematic diagrams showing the data tables of the audience rating of genre divided according to life scene;

FIGS. 5A and 5B to 10A and 10B are schematic diagrams showing concrete examples of the audience rating of genre divided according to life scene;

FIG. 12 is a schematic diagram showing the audience ratings of genres for each life scene divided according to the first cluster;

FIGS. 13A and 13B are schematic diagrams showing the user models based on "audience rating data" and "often-watched picture data";

FIG. 14 is a schematic diagram showing the concrete example of the often-watched picture data divided according to age;

FIGS. 15A and 15B are schematic diagrams showing the user models based on "audience rating data" and "often-watched picture data";

FIGS. 16A and 16D are schematic diagrams showing the user models based on "audience rating data" and "often-watched picture data";

FIG. 17 is a schematic diagram showing the concrete example of the often-watched picture data which is divided according to cluster;

FIGS. 21 and 22 are schematic diagrams showing interactive pictures;

FIGS. 23A and 23B are schematic diagrams showing interactive pictures at the time of inputting a profile relating to an attitude value factor;

FIG. 24 is a schematic diagram showing an interactive picture at the time of inputting a profile relating to an attitude value cluster;

FIG. 26 is a schematic diagram showing knowledge base data with identification in linear interpolation;

FIG. 29 is a schematic diagram showing the display example of programs to be selected;

FIG. 32 is a schematic diagram showing the other display example of programs to be selected;

FIG. 34 is a schematic diagram showing a user member registering picture at a public scene; and FIG. 35 is a schematic diagram showing a group registering picture at a public scene.

DETAILED DESCRIPTION OF THE EMBODIMENT

Preferred embodiments of this invention will be described with reference to the accompanying drawings:

(1) The whole construction of a satellite broadcasting receiving system

Figure 1:
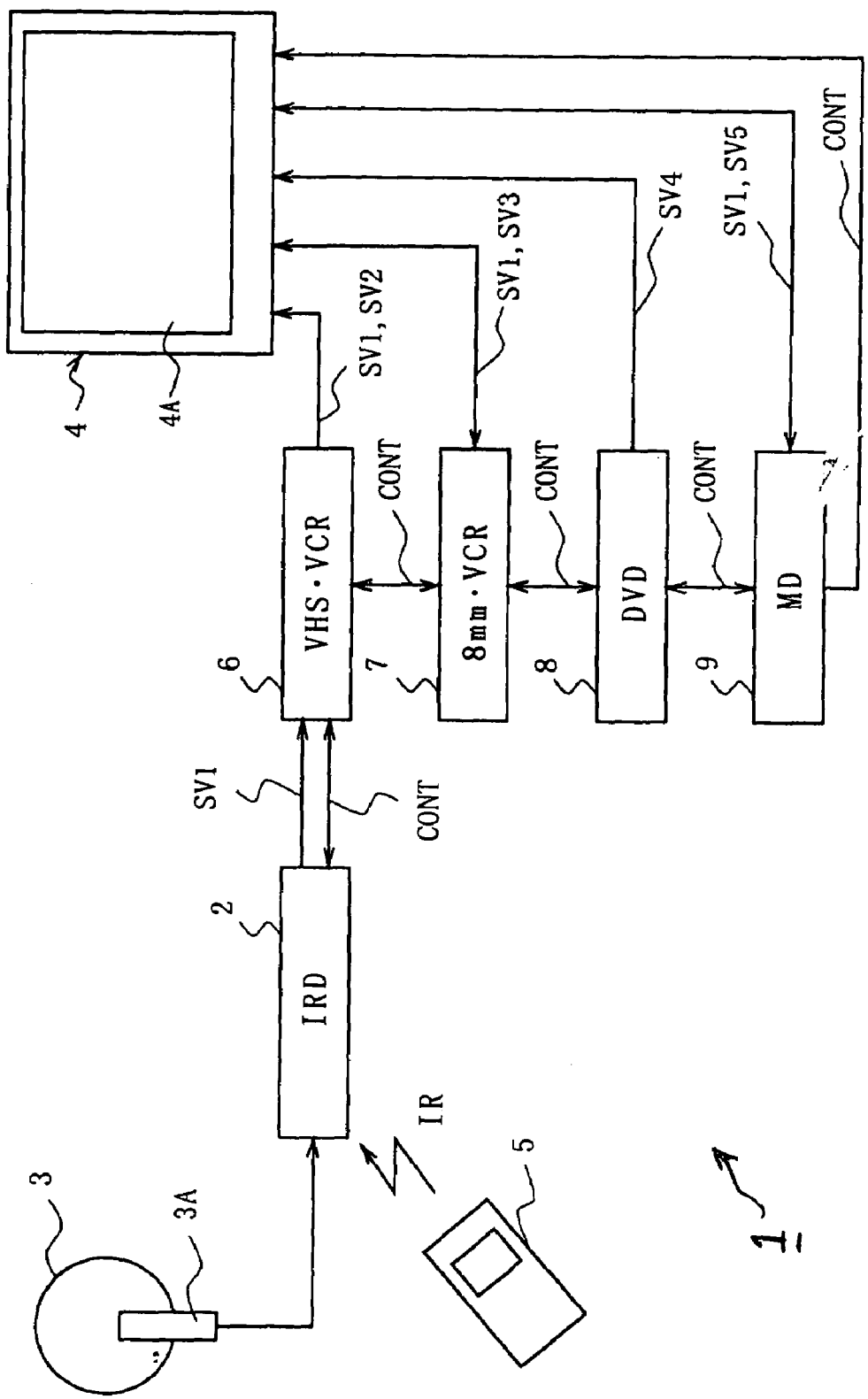
FIG. 1 is a block diagram showing a satellite broadcasting receiving system using an information retrieval apparatus according to this invention.

In FIG. 1, 1 generally shows a satellite broadcasting receiving system. Broadcasting signal received by a parabolic antenna 3 is demodulated and compressive-decoded at an integrated receiver/decoder (IRD) 2. The obtained video/audio signal SV1 is outputted to a VHS-system video cassette recorder (VCR) 6.

The VCR 6 records the video/audio signal SV1 on a video tape which has been loaded inside, or outputs the video/audio signal SV1 through the output line to a monitor device 4 as it is to display this on the monitor device 4.

While, when an audience operates a remote commander 5, a command in accordance with the operation is converted into infrared-ray signal IR, and is outputted to the integrated receiver/decoder 2. The integrated receiver/decoder 2, in accordance with the command, performs various operations such as channel change, user data registration/reading, and output of control signal CONT to devices (VCR 6, VCR 7, DVD 8, and MD 9) connected to the integrated receiver/decoder 2. The control signal CONT is outputted to the VCR 6 through the control line. If the VCR 6 is specified as a target to be controlled by the control signal CONT, the VCR 6 is controlled by the control signal CONT. On the contrary, if one of the devices successively connected to the VCR 6 through the control line (a 8 mm-system VCR 7, a digital video disc (DVD) player 8, a mini disc (MD) player, and the monitor device 4) is specified, the VCR 6 outputs the control signal CONT to the 8 mm-system VCR 7 as it is.

When the control signal CONT is inputted, the VCR 7 discriminates the device specified by the control signal CONT. If the discriminated result in the VCR 7, the VCR 7 executes the operation specified by the control signal CONT. In the case where the command is to reproduce the 8 mm video taps loaded in the VCR 7 for example, the VCR 7 reproduces the video tape and outputs the reproduction video signal SV3 to the monitor device 4 to display this. Also, in the case where the command of the control signal CONT is to record the broadcasting signal (video/audio signal SV1) received and decoded by the integrated receiver/decoder 2 on the VCR 7, the VCR 7 records the video/audio signal SV1 inputted from the integrated receiver/decoder 2 via the VHS-system VCR 6 and the monitor device 4. On the contrary, when a target to be controlled by the control signal CONT is not the VCR 7, the VCR 7 outputs the control signal CONT to the DVD 8 as it is.

When the control signal CONT is inputted, the DVD 8 discriminates the device specified by the control signal CONT. If the discriminated result is the DVD 8, the DVD 8 executes the operation specified by the control signal CONT. In the case where the command is to reproduce a video and/or audio from a disc loaded in the DVD 8 for example, the DVD 8 reproduces the disc and outputs the video/audio signals SV4 to the monitor device 4 to display this. On the contrary, when a target to be controlled by the control signal CONT is not the DVD 8, the DVD 8 outputs the control signal CONT to the MD 9 as it is.

When the control signal CONT is inputted, the MD 9 discriminates the device specified by the control signal CONT. IF the discriminated result is the MD 9, the MD 9 executes the operation specified by the control signal CONT. In the case where the command is to reproduce a disc loaded in the MD 9 for example, the MD 9 reproduces the disc and outputs the audio signal SV5 to the monitor device 4 to display that the disc can be listened. Also, in the case where the command of the control signal CONT is to record the broadcasting signal (video/audio signal SV1) received and decoded by the integrated receiver/decoder 2 on the MD 9, the MD 9 records audio signal of the video/audio signal SV1 inputted from the integrated receiver/decoder 2 via the VHS-system VCR 6 and the monitor device 4. On the contrary, when a target to be controlled by the control signal CONT is not the MD 9, the MD 9 outputs the control signal CONT to the monitor device 4 as it is. At this time, the monitor device 4 executes the operation specified by the control signal CONT.

(2) The construction of the integrated receiver/decoder

Figure 2:
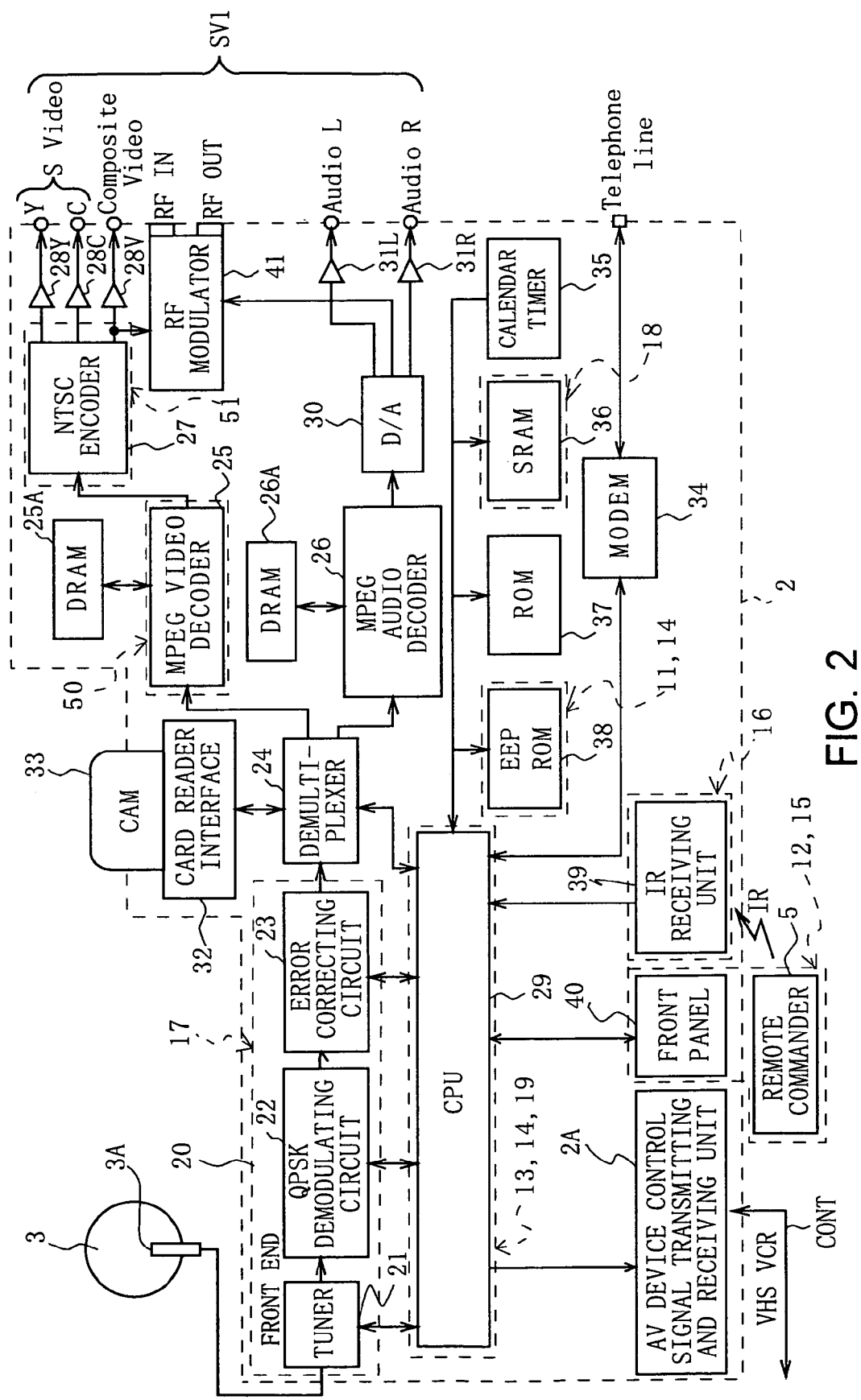
FIG. 2 is a block diagram showing the construction of an integrated receiver/decoder including the information retrieval apparatus.

In FIG. 2, in the integrated receiver/decoder 2, RF signal outputted from a low noise block down converter (LNB) 3A of the parabolic antenna 3 is supplied to a tuner 21 of a front end 20 to be demodulated. The output of the tuner 21 is supplied to a QPSK demodulating circuit 22 to be QPSK-demodulated. The output of the QPSK demodulating circuit 22 is supplied to an error correcting circuit 23 where errors are detected, corrected, and revised if necessary.

In a conditional access module (CAM) 33 composed of a CPU and IC cards being a ROM and a RAM, the keys necessary to decipher codes are stored together with a deciphering program. Since the signal transmitted via the broadcasting satellite is coded, the keys and deciphering processing are needed to decipher the codes. Therefore, the keys are read from the CAM 33 via a card reader interface 32, and supplied to a demultiplexer 24. The demultiplexer 24 uses the keys to decipher the coded signal.

The demultiplexer 24 receives the signal outputted from the error correcting circuit 23 of the front end 20, supplies the deciphered video signal to a MPEG video decoder 25, and supplies the deciphered audio signal to a MPEG audio decoder 26.

The MPEG video decoder 25 stores the inputted digital video signal in a DRAM 25A, and decodes the video signal which has been compressed by MPEG method. The decoded video signal is supplied to a NTSC encoder 27, and converted into luminance signal (Y), chroma signal (C), and composite signal (V) of NTSC method. The luminance signal and the chroma signal are outputted as S video signal via a buffer amplifiers 28Y and 28C. The composite signal is outputted via a buffer amplifier 28V.

The MPEG audio decoder 26 stores the digital audio signal supplied from the demultiplexer 24 in a DRAM 26A, and decodes the audio signal which has been compressed by MPEG method. The decoded audio signal is digital-to-analog converted in a D/A converter 30. Left-channel audio signal is outputted via a buffer amplifier 31L, and right-channel audio signal is outputted via a buffer amplifier 31R.

A RF modulator 41 converts the composite signal outputted from the NTSC encoder 27 and the audio signal outputted from the D/A converter 30 into RF signal, and outputs them. Also, the RF signal of NTSC method inputted from other devices passes through the RF modulator 41, and it is outputted to other devices as it is.

In this embodiment, these video signal and audio signal are supplied to the VCR 6 through the AV line.

The CPU 29 executes various processing in accordance with the program which has been stored in the ROM 37. Further, the CPU 29 controls an AV device control signal transmitting and receiving unit 2A, outputs a predetermined control signal to other devices through the control line, and receives control signal from other devices.

The operation button switch of a front panel 40 is operated to input a predetermined command directly to the CPU 29. When the operation keys of the remote commander 5 are operated, infrared ray signal is outputted by an IR sending unit of the remote commander 5, the infrared ray signal is received by an IR receiving unit 39, and the received result is supplied to the CPU 29. Accordingly, the remote commander 5 is operated to input a predetermined command to the CPU 29.

The CPU 29 takes in, e.g., electronic program guide (EPG) information excepting for the video signal and audio signal outputted from the demultiplexer 24, to generate EPG data from this, and supplies it to a static random access memory (SRAM) 36 to be stored. The EPG information includes the information relating to programs of broadcasting channels from current time to several ten hours later (e.g., channel of program, broadcasting period, title, genre, explanation of program, etc.). Since the EPG information is transmitted frequently, the latest EPG information is constantly maintained in the SRAM 36.

In an electrically erasable programmable read only memory (EEPROM) 38, data which is desired to be maintained after shutting off the power supply (e.g., rewritable receipt history for past four weeks or data of a knowledge base unit 11 described later) is stored. The CPU 29 compares time information outputted from a calendar timer 35 with time stamp separated from the received signal by the demultiplexer 24 and outputted, and controls the MPEG video decoder 25 and the MPEG audio decoder 26 so as to decode at a correct timing in accordance with the compared result.

Further, the CPU 29 controls the MPEG video decoder 25 to generate a predetermined on-screen display (OSD) data. The MPEG video decoder 25 generates the predetermined OSD data in accordance with this control, which is written in the DRAM 25A and read to be outputted. Thereby, predetermined characters and figures can be outputted to the monitor device 4 and displayed.

Figure 3:
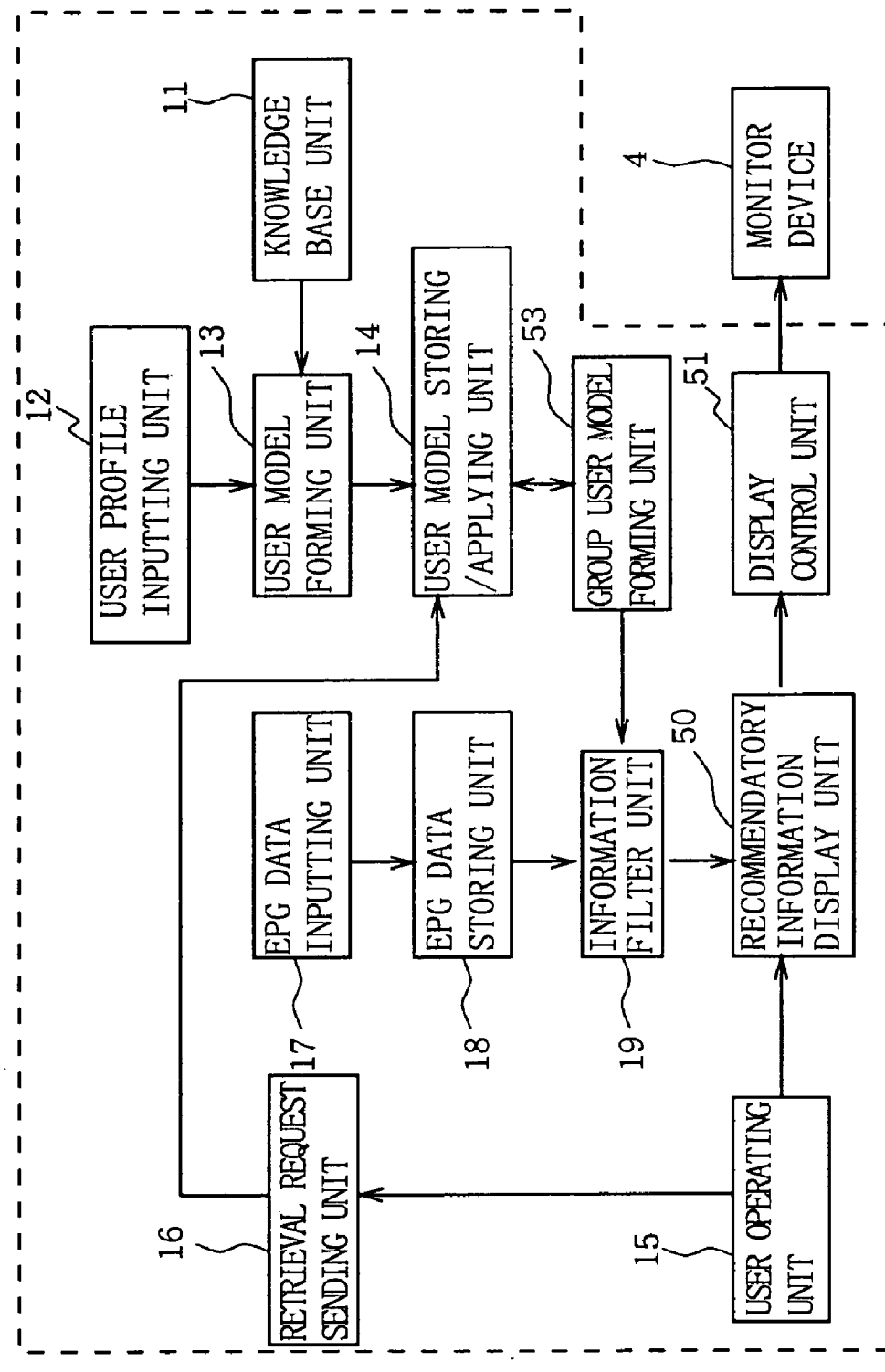
FIG. 3 is a block diagram showing an information retrieval function block of the integrated receiver/decoder.

FIG. 3 shows a block diagram of the information retrieval function unit for retrieving a program desired by a user based on the EPG information in the integrated receiver/decoder 2 of FIG. 2. More specifically, as shown in FIG. 3, the EEPROM 38 (FIG. 2) of the integrated receiver/decoder 2 is assigned as the knowledge base unit 11, a user model storing/applying unit 14, and the EPG data storing unit 18 (however, the CPU 29 (FIG. 2) is assigned to the applying unit of the user model storing/applying unit 14.). The CPU 29 (FIG. 2) is assigned as the user model forming unit 13, a group user model forming unit 53, and the information filter unit 19. The front end 20 (FIG. 2) is assigned as the EPG data inputting unit 17. The remote commander 5 and the front panel 40 (FIG. 2) are assigned as the user profile inputting unit 12 and the user operating unit 15. The IR receiving unit 39 and the CPU 29 (FIG. 2) are assigned as the retrieval request sending unit 16. The MPEG video decoder 25 (FIG. 2) is assigned as a recommendatory information display unit 50. The NTSC encoder 27 (FIG. 2) is assigned as the display control unit 51. In connection, the data of the knowledge base unit 11 is stored in the EEPROM 38 when the integrated receiver/decoder 2 is shipped, and new data is taken in from the exterior via a satellite or a modem 34, so that data can be updated. If the data of the knowledge base unit 11 is not to be updated, the data previously stored as data of the knowledge base unit 11 may be stored in the ROM 37. The EPG data taken in via the front end 20 (FIG. 2) or the modem 34 (in the case of Internet) is stored in the SRAM 36.

When the operation key of program guide is selected by the user operation unit 15 of FIG. 3, the CPU 29 of FIG. 2 controls the MPEG video decoder 25 (the recommendatory information display unit 50) to display a broadcasting program selection picture on the monitor device 4. A user transfers a cursor to the position of a desired program, and clicks the remote commander 5 to select and specify the desired program.

Further, the CPU 29 can update the data stored in the EEPROM 38 (i.e., the knowledge base unit 11 of FIG. 3) with the latest data taken in from the exterior via the modem 34. In connection, as a method of taking in the data of the EEPROM 38 from an exterior device (a floppy disc, a card recording medium, etc.), the output line for only data may be provided in addition to the communication using a modem.

The CPU 29 stores the data which has been stored in the EEPROM 38 (i.e., the knowledge base unit 11) in an exterior recording device via a modem or the output line provided exclusively (not shown), and it is taken in if necessary, so that the data of the knowledge base unit 11 before updating can be used again.

(3) Information retrieval by the integrated receiver/decoder (3-1) The construction of general user model FIG. 3 shows a function block of the part relating to the information retrieval of the integrated receiver/decoder 2 described above in FIG. 2. The knowledge base unit 11 previously stores, as "general user model", "watching action of user" obtained based on the result of audience research.

The "general user model" is the audience rating, showing for each genre, of programs watched by a user who is classified according to the various characteristics among from users being audience; and the audience rating of genre for each life scene, often-watched picture (genre), and watching time for a week, showing the state of information utilization of each user.

As the first method of classifying users, there is a classification according to age and sex. In this classification, users are divided into twelve items, in which six stages of teens to fifties and people sixty and over are further divided into male and female. The audience ratings of genre for each life scene of each user classified according to age and sex is kept as a data table TB1. As shown in FIG. 4A, the data is an audience rating table of each program genre for each life scene such as "breakfast time", "lunch time", "dinner time", "relaxation time on weekdays", and "relaxation time on a holiday". For example, a table is created from the audience ratings of a plurality of program genres at "breakfast time", which is divided according to age and sex.

FIGS. 5 to 10 show the concrete examples of the data table that these tabled data are collected for a plurality of life scenes. FIG. 5A shows the audience ratings of program genres for each life scene of teens-male, FIG. 5B shows the audience ratings of program genres for each life scene of twenties-male, FIG. 6A shows the audience ratings of program genres for each life scene of thirties-male, FIG. 6B shows the audience ratings of program genre for each life scene of forties-male, FIG. 7A shows the audience ratings of program genres for each life scene of fifties-male, and FIG. 7B shows the audience ratings of program genres for each life scene of sixties-male.

Also, FIG. 8A shows the audience ratings of program genres for each life scene of teens-female, FIG. 8B shows the audience ratings of program genres for each life scene of twenties-female, FIG. 9A shows the audience ratings of program genres for each life scene of thirties-female, FIG. 9B shows the audience ratings of program genres for each life scene of forties-female, FIG. 10A shows the audience ratings of program genres for each life scene of fifties-female, and FIG. 10B shows the audience ratings of program genres for each life scene of sixties-female.

Figure 11:
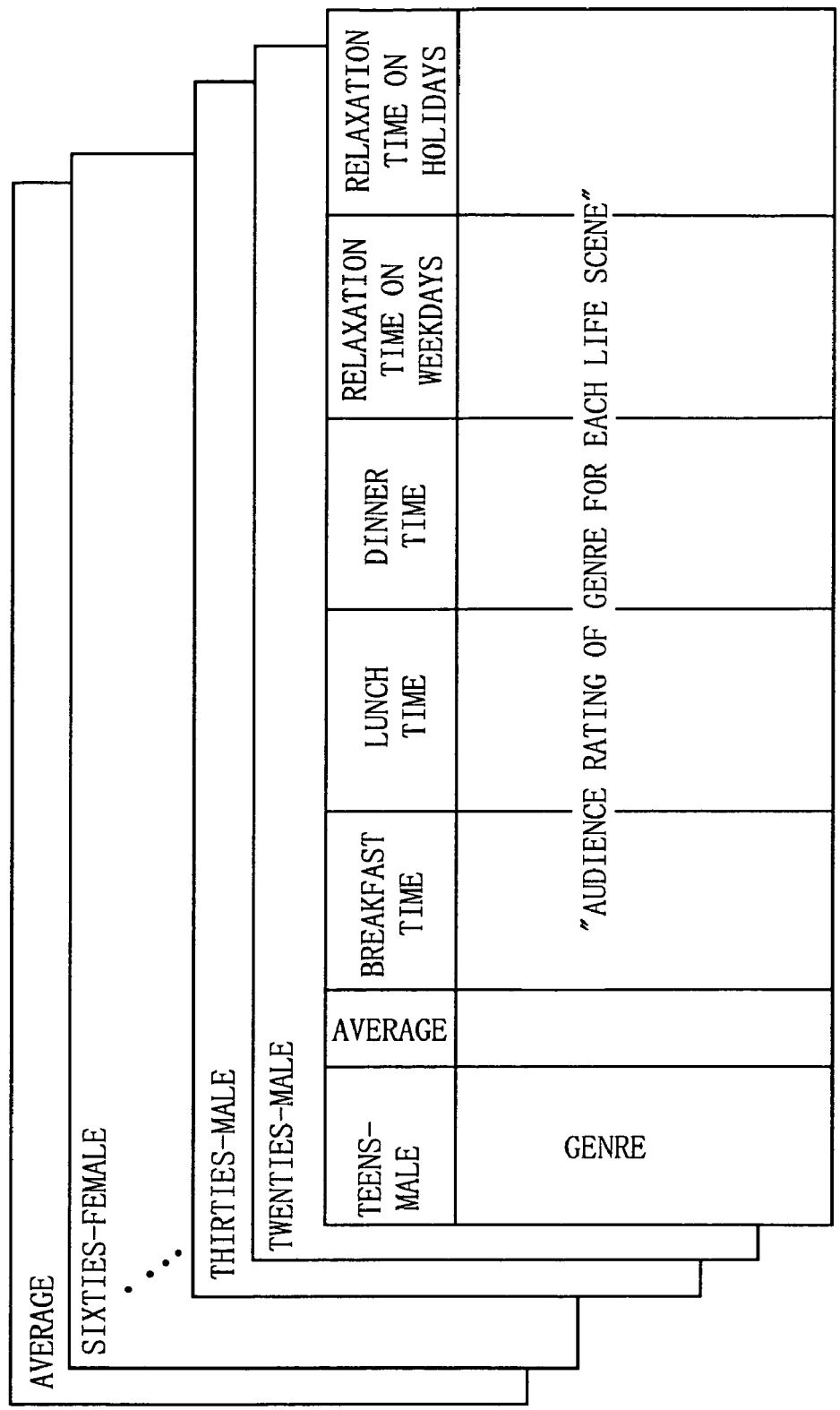
FIG. 11 is a schematic diagram showing the construction of audience rating data tables divided according to age and sex, life scene, and genre.

In this way, as shown in FIG. 11, data tables consisting of the audience ratings of program genre for each life scene divided according to age and sex, and an average data table which is obtained by calculating the average of the audience rating of each program genre between respective data tables are stored in the knowledge base unit 11 (FIG. 3), so that a habit of which the genre of program to be watched is determined depending on each life scene as a user's characteristics of selecting a program can be obtained previously as a general user data for each age and sex. Therefore, an audience inclination appearing for each age and sex of a general user can be obtained from the data table TB1.

Further, as the second method of classifying users, as shown in FIG. 4B, there is a classification according to life stage. In this classification, users are divided into stages such as "schooling", "work", "marriage", "nursing", and "retirement" as a personally growth stage of a user having a relation with user's family and society. The audience ratings of genres for each life scene of each user classified according to life stage is kept as a data table TB2. The data is an audience rating table of each program genre for each life scene such as "breakfast time", "lunch time", "dinner time", "relaxation time on weekdays", and "relaxation time on a holiday". For example, a table is created from the audience ratings of a plurality of program genres at "breakfast time", time is divided according to life stage. At this time, in a stage until a married female becomes more than sixty and retired, the stage is further divided into a female having job and a house wife.

In this way, data tables consisting of the audience ratings of program genre for each life scene divided according to life stage, and an average data table which is obtained by calculating the average of the audience rating of each program genre between respective data tables are stored in the knowledge base unit 11 (FIG. 3), so that a habit of which the genre of program to be watched is determined depending on each life scene as a user's characteristics of selecting a program can be obtained previously as a general user data for each life stage. Therefore, an audience inclination appearing for each life stage of a general user can be obtained from the data table TB2.

Further, as the third method of classifying users, as shown in FIG. 4C, there is a classification according to attitude value characteristics relating to television watching. In this classification according to attitude value characteristics, users are divided into eight factors based on the analyzed result of the opinion for watching television (television watching attitude value) from a statistically significant number of market researches covering audience. These factors are determined by a positive participation axis representing whether a user participates positively or not; a knowledge education axis representing whether a user demands a knowledge education or not; an affirmative/negative axis representing whether a user affirms television or not; an unrestriction/restriction axis representing whether a user watches television restrictedly or not; a trend inclination axis representing whether a user regards a trend as most important thing or not; a whim/standard axis representing whether a user watches television on a whim or not; an easiness/absorption axis representing whether a user watches television easily or not; and an loneliness/happy circle axis representing whether a user watches television alone or not. In each of thus classified factors, the high scored group which is upper sixteen percents of the users is defined as "+" upper group of each factor and the low scored group which is lower sixteen percents of the users is defined as "−" lower group of each factor. The audience rating of genre for each life scene of each group is kept as a data table TB3. The data is an audience rating table of each program genre for each life scene such as "breakfast time", "lunch time", "dinner time", "relaxation time on weekdays", and "relaxation time on a holiday". For example, a table is created from the audience ratings of a plurality of program genres at "breakfast time", for each factor.

In this way, data tables consisting of the audience ratings of program genre for each life scene divided according to factor, and an average data table which is obtained by calculating the average of the audience rating of each program genre between respective data tables are stored in the knowledge base unit 11 (FIG. 3), so that a habit of which the genre of program to be watched is determined depending on each life scene as a user's characteristics of selecting a program can be obtained previously as a general user data for each factor (that is, television watching attitude value). Therefore, an audience inclination appearing for each value of a general user can be obtained from the data table TB3.

As a method of classification of attitude value characteristics on television watching, there is a classification according to cluster in addition to a classification according to factor as shown in FIG. 4C. In this classification according to cluster, for example, the television watching attitude and three factors of action (a positive participation axis, an unrestriction/restriction axis, an easiness/absorption axis) are picked up among from eight factors described above in FIG. 4C to analyze them, so as to obtain eight user clusters.

More specifically, the eight user clusters are: "balanced" group who are standard audience and slightly television affirmative audience, watch unrestrictedly, and prefer an easy program without story, as the first cluster; "unrestrictedly zapping" group who watch television unrestrictedly, prefer an easy program without story, and are negative to television, as the second cluster; "unrestricted" group who watch television most unrestrictedly, do not participate positively, and prefer a program with story and drama, as the third cluster; "absorbed in story program" group who prefer an impression with story and drama, do not participate positively, and watch television restrictedly, as the fourth cluster; "television is my friend" group who participate positively to enjoy themselves, prefer an impressive program with story and drama, and have a tendency to watch television unrestrictedly, as the fifth cluster; "anti-television" group who are negative to television, select only a desired program, and watch an easy program without story, as the sixth cluster; "busy" group who like television but can not watch because he/she is busy, select only an especially desired program, are comparatively affirmative and participating audience, and watch regardless of an impressive program with drama or an easy program, as the seventh cluster; and "laughter" group who prefer an easy and comfortable program without story, are affirmative audience and participate positively, and select comparatively only a desired program, as the eight cluster.

In this way, data tables consisting of the audience ratings of program genre for each life scene divided according to cluster, and an average data table which is obtained by calculating the average of the audience rating of each program genre between respective data tables are stored in the knowledge base unit 11 (FIG. 3), so that a habit of which the genre of program to be watched is determined depending on each life scene as a user's characteristics of selecting a program can be obtained previously as a general user data for each cluster (that is, television watching attitude value). Therefore, an audience inclination appearing for each value of a general user can be obtained from the data table. In connection, FIG. 12 shows the concrete example of the audience ratings of genre divided for each life scene of the first cluster.

As a general user data stored in the knowledge base unit 11 (FIG. 3), there is information utilizing state data of user. The first information utilizing state data is, as shown in FIG. 13A, a table created from weekly audience rating data corresponding to each program genre for each age and sex, and as shown in FIG. 13B, a table crated from often-watched program genre for each age and sex by audience rating. FIG. 14 shows the concrete example of table of FIG. 13B.

The second information utilizing state data is, as shown in FIG. 15A, a table created from weekly audience rating data corresponding to each program genre for each life stage, and as shown in FIG. 15B, a table created from often-watched program genre for each life stage by audience rating.

The third information utilizing state data is, as shown in FIG. 16A, a table created from weekly audience rating data corresponding to each program genre for each factor axis, and as shown in FIG. 16B, a table created from often-watched program genre for each factor axis by audience rating.

The fourth information utilizing state data is, as shown in FIG. 16C, a table created from weekly audience rating data corresponding to each program genre for each attitude value cluster, and as shown in FIG. 16D, a table created from often-watched program genre for each attitude value cluster by audience rating. FIG. 17 shows the concrete example of the eight clusters described above and the often-watched program genre corresponding to each cluster.

(3-2) Formation of specific user model

In FIG. 3, a user operates the user profile inputting unit 12 to form a specific user model suiting a specific user. More specifically, a user operates the remote commander 5 (FIG. 2) of the user profile unit 15, so as to input a user profile interactively on a picture displayed on the monitor device 4.

Figure 18:
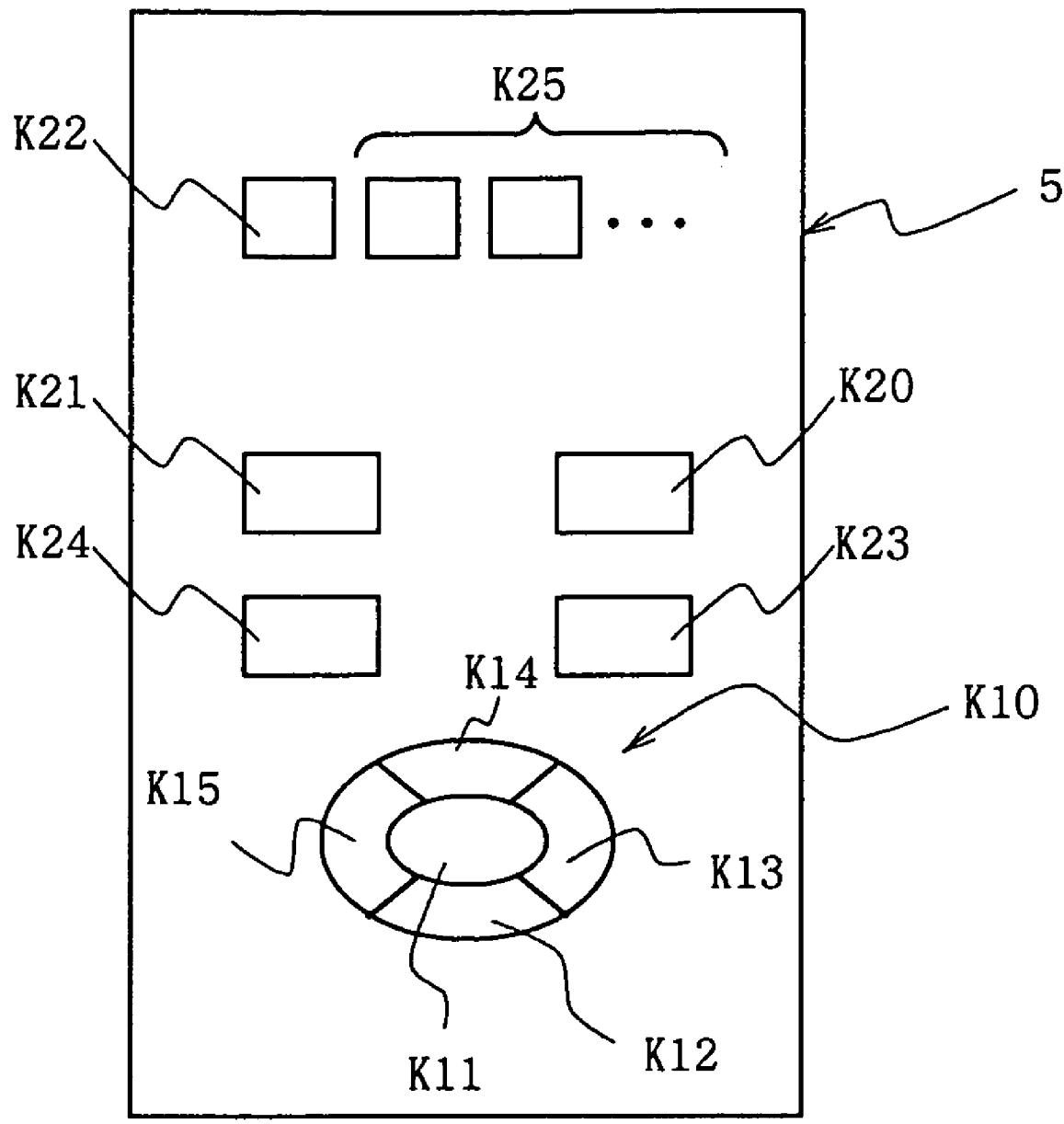
FIG. 18 is a plane diagram illustrating the arrangement of operation keys of a remote commander.

FIG. 18 shows operation keys of the remote commander 5. A cursor transfer key group K10 has transfer keys K14, K12, K15, K13 for transferring a cursor up and down, left and right, and a determination key K11 for determining the item specified by a cursor. Further, the remote commander 5 is provided with a guide key K21 for requesting a program guide, an explanation key K20 for displaying various kinds of explanations on a monitor picture, a menu display key K22 for displaying various kinds of menus on a monitor picture, a mode selection key K23 used when a group user is formed, a family mode key K24 for extracting all user's data which have been registered when a group user is formed.

Figure 19:
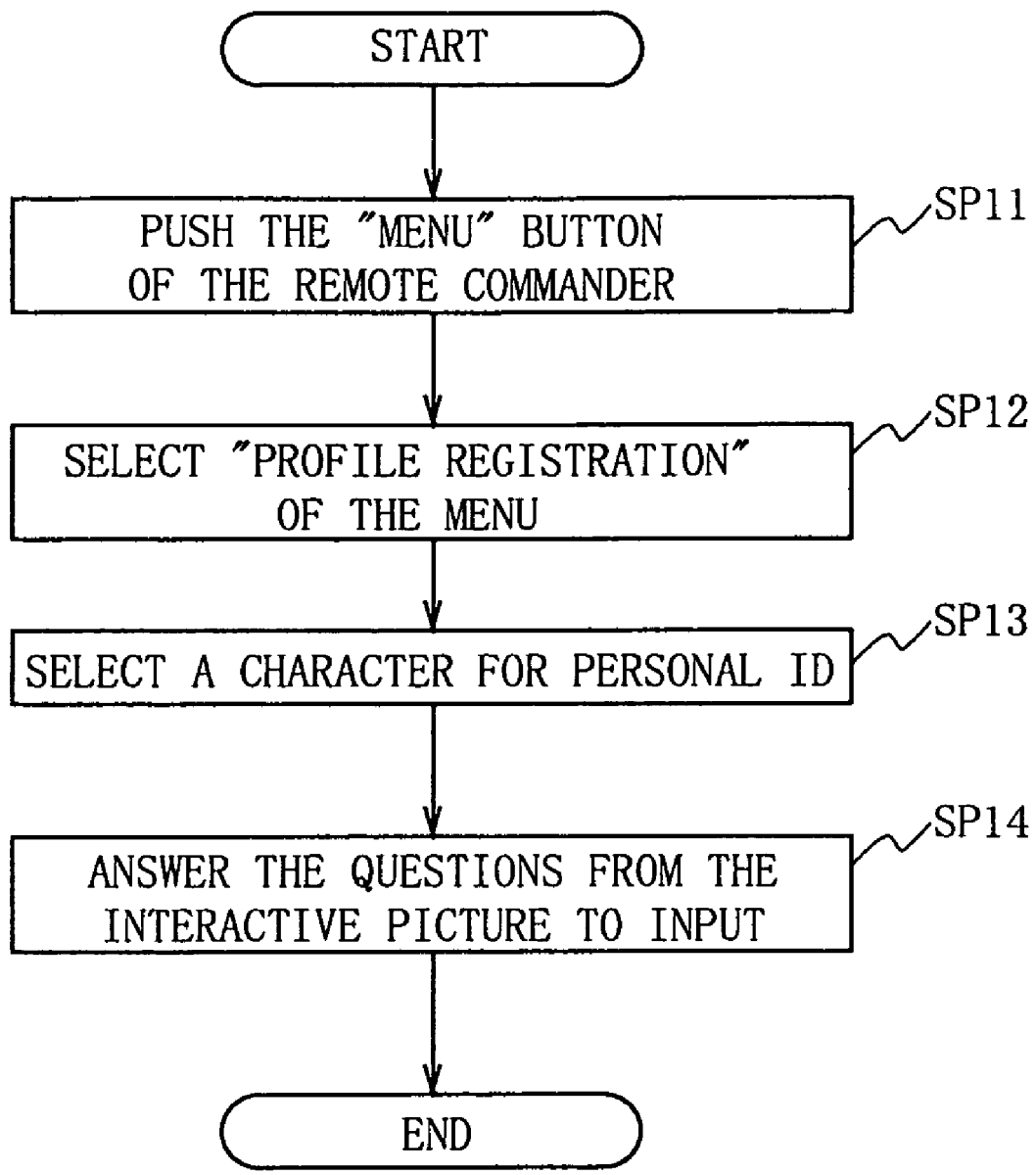
FIG. 19 is a flow chart showing a profile registering procedure.

The inputting procedure is shown in FIG. 19. A user first operates "menu" display key K22 of the remote commander 5 at step SP11 of the procedure, so that the CPU 29 (FIG. 2) of the integrated receiver/decoder 2 displays a menu picture on the display picture 4A of the monitor device 4. At next step SP12, the user operates the cursor transfer keys K10 of the remote commander 5, so as to transfer a cursor on the picture to a position where a profile registration is specified, and selects this through the determination key.

Figure 20:
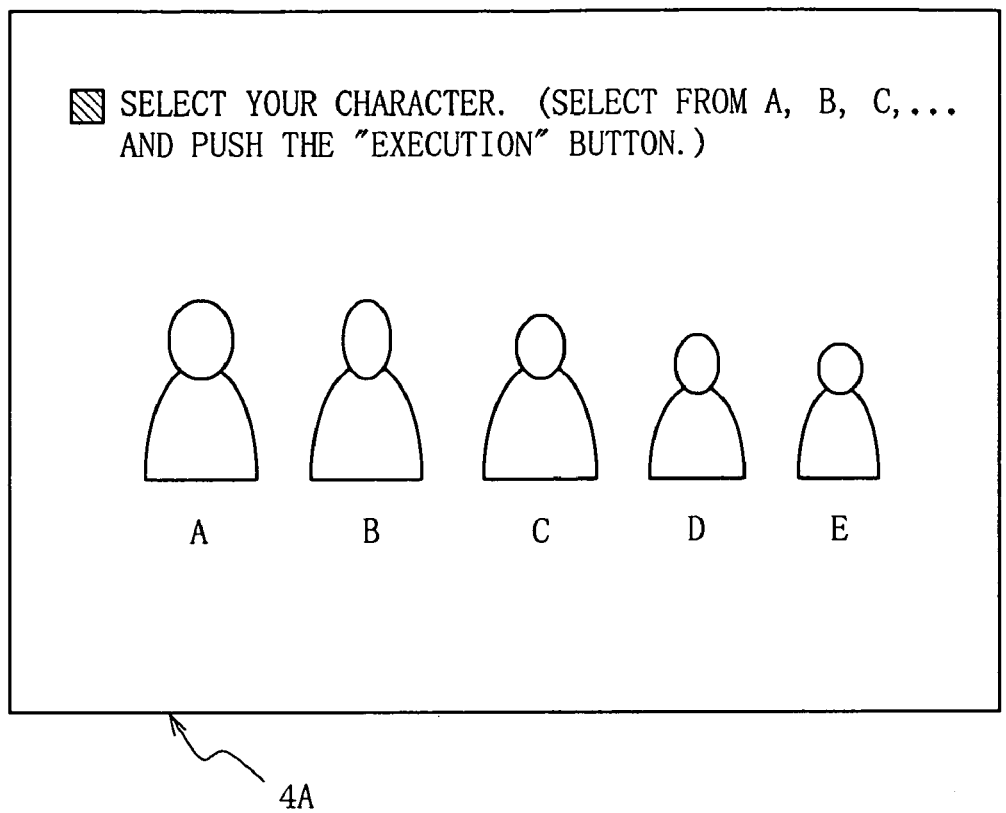
FIG. 20 is a schematic diagram showing a picture for selecting a character for personal ID.

Therefore, the picture to select a character for personal ID shown in FIG. 20 is displayed on the monitor picture 4A. At step SP13, the user inputs the user's personal ID with an interactive system on a picture. In FIG. 20, one of characters "A" to "E" is specified so that one of the five characters can be registered as a personal ID character of a specific user who input a profile at this time.

When the registration of a personal ID character is completed, another interactive picture is displayed on the monitor picture 4A. At step SP14, the user answers the questions from the interactive picture to input a user profile. At step SP14, the interactive picture shown in FIG. 21 is first displayed. FIG. 21 shows a question picture corresponding to the data table TB1 (FIG. 4A) of general user classified and set for each age and sex in the knowledge base unit 11. The user operates the remote commander 5 to transfer a cursor on the picture, and clicks the determination key K11 so as to input the age and sex specified by a cursor.

When the input of age and sex is completed, an interactive picture shown in FIG. 22 is displayed on the monitor device 4. FIG. 22 shows a question picture corresponding to the data table TB2 (FIG. 4B) of general user classified and set for each life stage in the knowledge base unit 11. The user operates the remote commander 5 to transfer a cursor on the picture, and clicks the setting key so as to input the life stage item specified by a cursor.

When the input of life stage is completed, interactive pictures shown in FIGS. 23A and 23B are displayed on the monitor device 4. FIGS. 23A and 23B show question pictures corresponding to the data table TB3 (FIG. 4C) of general user classified and set for each factor of attitude value relating to television audience in the knowledge base unit 11. The user operates the remote commander 5 to transfer a cursor on the pictures, and clicks the setting key so as to input the factor item specified by a cursor.

When the input of factor item is completed, an interactive picture shown in FIG. 24 is displayed on the monitor device 4. FIG. 24 shows a question picture corresponding to the data table (FIG. 12) of general user classified and set for each cluster of attitude value relating to television audience in the knowledge base unit 11. The user operates the remote commander 5 to transfer a cursor on the picture, and clicks the determination key K11 so as to input the cluster specified by a cursor.

The profile data of a specific user inputted from the user profile inputting unit 12 in FIG. 3 in this way is outputted to the user model forming unit 13 (FIG. 3). The user model forming unit 13 checks the user profile data inputted from the user profile inputting unit 12 against each data table of the knowledge base unit 11, and specifies a user group among from the data tables conforming to the user profile data, which is set to a user model. For example, when the user model of thirties-male is specified at the time of inputting a profile of age and sex, the thirties-male table is formed as a user model $U_{1A}$ of the specific user from each data table consisting the audience rating data divided according to age and sex, life scene, and genre described above in FIG. 11.

Similarly, a user model $U_{1B}$ divided according to life stage, a user model divided according to factor, and a user model divided according to cluster are formed in accordance with respective profile input.

The user model forming unit 13 obtains a table $U_1$ of "the audience rating of genre divided according to life scene viewed from demographic" represented by the following equation:

$$U_1 = \frac{U_{1A} + U_{1B}}{2} \quad (1)$$

from the user model $U_{1A}$ divided according to age and sex, and the user model $U_{1B}$ divided according to life stage.

Further, the user model forming unit 13 obtains the table $U_2$ of audience rating of genre divided according to life scene viewed from a factor axis relating to the specific user, from the profile input data (FIGS. 23A and 23B) relating to a factor of the specific user who operates at this time, for each factor of the audience rating of genre divided according to life scene (FIG. 4C) viewed from a factor axis of the general user model which have been previously stored in the knowledge base unit 11. More specifically, a factor value $F_{(n)}$ of the specific user at this time is obtained for each factor of eight items from the profile input data divided according to a factor item described above in FIG. 21, and a table is created for each life scene from the average value of the audience rating for each program genre corresponding to factor values $F_{(n)}$ of eight factors, so that the audience rating table $U_2$ of genre divided according to life scene viewed from a factor axis relating to the specific user is obtained.

Figure 25:
FIG. 25 is a schematic diagram showing a data table of a specific user.

Therefore, the user model forming unit 13 obtains the "the audience rating of genre divided according to life scene" data U of the specific user, by the following equation:

$$U = \frac{U_1 + U_2}{2} \quad (2)$$

from "the audience rating of genre divided according to life scene viewed from demographic" table $U_1$ and "the audience rating of genre divided according to life scene viewed from a factor axis" table $U_2$. As a result, "the audience rating of genre divided according to life scene" table relating to the specific user as shown in FIG. 25 is obtained, and is registered in the user model storing/applying unit 14 together with a character data for personal ID described above in FIG. 20. In connection, the user model storing/applying unit 14 is provided with storage area for each of plurality of specific users, and the user data is stored thereon together with a corresponding ID character data.

The specific user data in FIG. 25 is the case of thirties-male, but the case where the specific user is 28 year-old male is described here. The knowledge base unit 11 has attribute data of a format that an interpolation control identification key "1" is added to each data divided according to age "10, 1, 20, 1, 30, 1, 40, 1, 50, 1, 60, 1) as an attribute of the user group divided according to age. Therefore, when the data "28 year-old male" is input to the user profile input unit 12, the user model forming unit 13 detects the interpolation control identification key "1", age and sex from the data received from the user profile input unit 12, confirms this with the interpolation control identification key "1" of the data of twenties-male and thirties-male shown in FIG. 26 extracted from the knowledge base unit 11 to check, and forms the user model data of the personal user by applying the calculation equation corresponding to each interpolation control identification key, that is the linear interpolation here.

Thus, the continuous age data which is compressed for each ten-years can be stored in the knowledge based unit 11. In connection, as an attribute of the user classification using the interpolation control efficiently, there are user's hobby, years of experience of sports, and continued years of membership in addition to age attribute described above in FIG. 26.

Figure 27A:
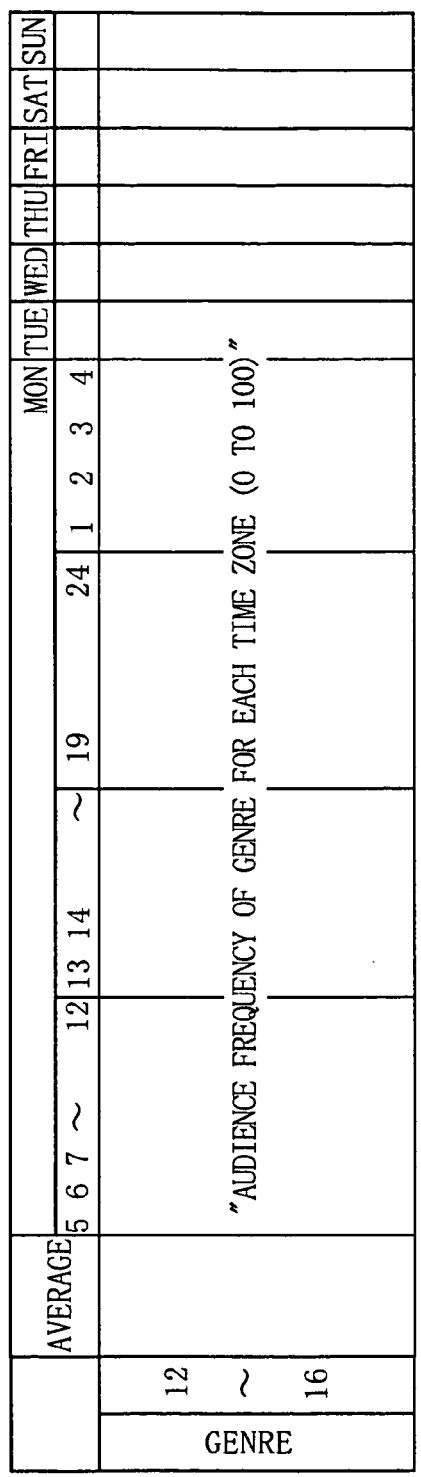
FIGS. 27A and 27B are schematic diagrams explaining data conversion by a corresponding function.
Figure 27B:
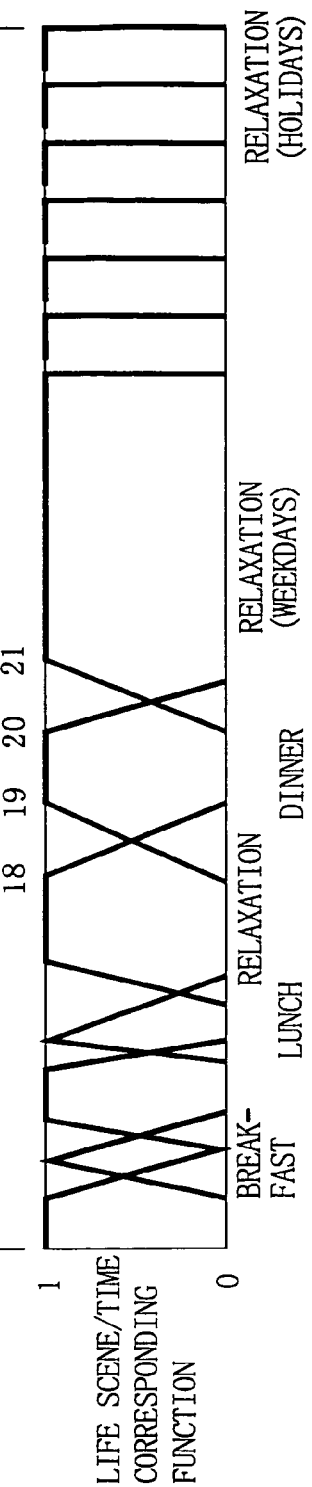

The thus obtained data of "audience rating of genre divided according to life scene" relating to the specific user is obtained on the basis of the life scene of general user model. In this case, the user model forming unit 13 has the life scene/time corresponding function shown in FIGS. 27A and 27B, and this function is outputted to the user model storing/applying unit 14, so that the genre taste value (audience rating) corresponding to the life scene at the time of "n" when the user requests the program guide actually is calculated at the user model storing/applying unit 14. In connection, it can be judged that the degree of taste is higher as the audience rating becomes higher. Thereby, the taste value is obtained by assigning the audience rating as it is, or the number in accordance with the ratio.

For example, the audience rating data at dinner is multiplied by a coefficient "1" between 19:00 to 20:00 and a coefficient "0" at 21:00. Each data is multiplied by a coefficient according to the linear interpolation between 20:00 to 21:00. Data at a relaxing time after dinner is multiplied by a coefficient "1" after 21:00, and the data at a relaxing time is multiplied by a coefficient "0" at 20:00.

As a concrete example, if a program guide is requested at 20:40, the user model storing/applying unit 14 calculates the genre taste value $F_{20}$ at 20:40, setting the genre taste value at dinner to $F_y$ and the genre taste value at a relaxing time on weekdays to $F_k$, by the following equation:

$$F_{20} = \frac{F_y \cdot (60 - 40)}{60} + \frac{F_k \cdot 40}{60} \quad (3)$$

In connection, the genre taste value obtained by the corresponding function is calculated by the corresponding function (parameter is a constant value) which is determined as a life scene of the general user model. In this embodiment, the user model forming unit 13 converts "audience rating of genre divided according to life scene" of the specific user obtained based on the user profile input into the data table fitting for the life habit of the specific user based on the meal time data of the specific user.

Figure 28:
FIG. 28 is a schematic diagram showing an interactive picture.

More specifically, the knowledge base unit 11 has a variable term which changes in accordance with the life habit of the specific user on the corresponding function. The user model forming unit 13 demands a user to input a variable data to be substituted for the variable term. The user model forming unit 13 displays an interactive picture shown in FIG. 28 on the monitor device 4 as an input demand. In accordance with this picture, the user inputs usual dinner starting time "a", usual dinner finishing time "b", earlier dinner starting time "c", and later dinner finishing time "d" as variable data by using the remote commander. Then, the user model forming unit 13 calculates the genre taste value (audience rating) at a time "n" (o'clock) when a program guide is requested, based on the input data.

More specifically, if the time "n" when a program guide is requested is between "a" and "b", the genre taste value $F_{yn}$ relating to the life scene at dinner at the time "n" is calculated, setting the genre taste value of general user at dinner to $F_y$, by the following equation:

$$F_{yn} = F_y \text{ (where, } a \leq n \leq b) \tag{4}$$

Further, if the time "n" when a program guide is requested is between "c" and "a", the genre taste value $F_{yn}$ relating to the life scene at dinner at the time "n" is calculated by the following equation:

$$F_{yn} = F_y \cdot \frac{n-c}{a-c} \tag{5}$$

(where, $c \leq n < a$)

Further, if the time "n" when a program guide is requested is between "b" and "d", the genre taste value $F_{yn}$ relating to the life scene at dinner at the time "n" is calculated by the following equation:

$$F_{yn} = F_y \cdot \frac{d-n}{d-b} \tag{6}$$

(where, $b < n \leq d$)

Further, if there are the life scenes having the number of "m", and the genre taste value relating to all of life scene at the time "n" when a program guide is requested is set to $F_n$, it is represented by the following equation:

$$F_n = \sum F_{mn} \tag{7}$$

However, if $F_n > 1$, $F_n = 1$, and when setting the average value of the genre taste to $F_n$, if the genre taste value $F_n$ is less than a fixed ratio of the average value $F_a$ (e.g., a half of $F_a$), $F_n = 0.5F_a$.

Thus obtained data is calculated whenever a program guide is requested from a user, and is outputted to the information filter unit 19 (FIG. 3).

In this way, the time which is a continuous amount is compressed by the life scene data, and corrected to data suiting the specific user's habit. In connection, other attribute data such as time spent in commuting which influences the utility of media, frequency of request for information, and passed period after a movie, music, or publication relating to news value is started to be sold can be used in addition to life scene, as an information utilizing state.

(3-3) The application of the specific user model

When a user operates, when watching television, a program guide key K21 and an ID input key K25 on the remote commander 5 (FIG. 2) of the user operation unit 15, the program guide demand command of the specific user specified by the ID is outputted from the remote commander 5 to the retrieval request sending unit 16. The retrieval request sending unit 16 outputs day of the week and time data read from the internal clock and filter data output requesting signal to the user model storing/applying unit 14, in accordance with the program guide demand.

The user model storing/applying unit 14 calculates the genre taste value $F_n$ corresponding to the day of the week and time data in demanding the program guide from the audience rating data table of the specific user model specified by the ID, and forms the genre priority order table, which is outputted to the information filter unit 19 via the group user model forming unit 53.

The information filter unit 19 rearranges the electronic program guide (EPG) data corresponding to the time a program guide is demanded, in accordance with the genre priority table, among from the EPG data which has been received at an EPG data information inputting unit 17 with the satellite broadcasting wave and stored in the EPG data storing unit 18, and outputs this data to a recommendatory information display unit 50.

Figure 29:
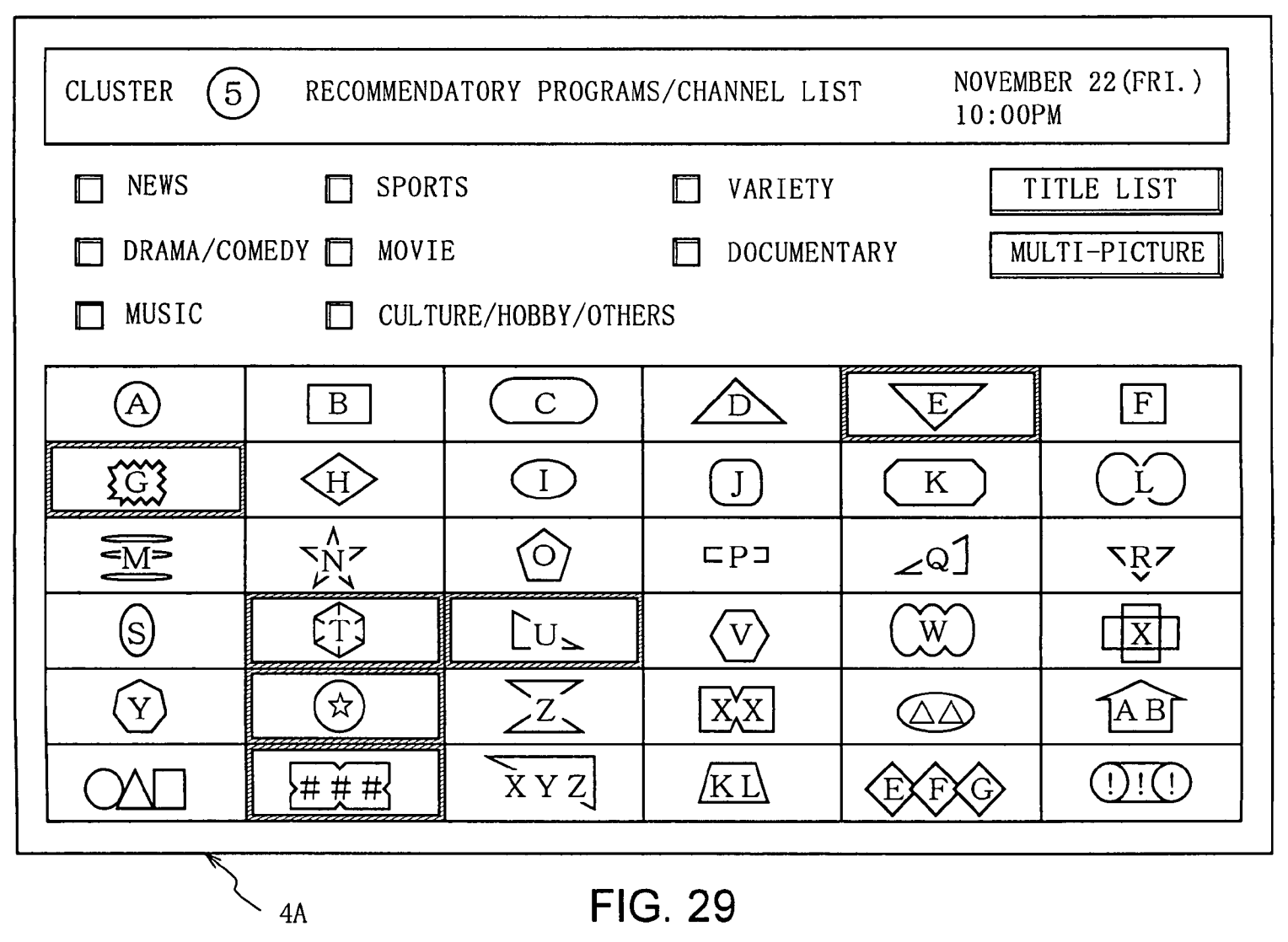

The recommendatory information display unit 50 displays the EPG data rearranged in accordance with the genre priority table on the monitor device 4 in the form of the predetermined display form. As a result, as shown in FIG. 29, the list of the programs being on the air is displayed when the program guide is demanded, by combining characters and/or figures representing the broadcasting station, etc. In this list, only programs prioritized by the information filter unit 19 are encircled by a bold frame. The bold frame has colors which are different from each other in genre. The user refers the color, and specifies and selects a desired program by a cursor among from the programs encircled by a bold frame.

In this way, the initial user model for each specific user is formed in addition to the ID character data, by the profile data inputted from the profile inputting unit 12, and a program desired by a user is selected based on the data. In connection, when the user specifies a predetermined time in the future for example, and demands a program guide, the retrieval request sending unit 16 outputs the time and date data to the user model storing/applying unit 14, so as to calculate the program selection information of the specified time and date.

(3-4) The formation and application of the group user model

The above-described mode is a personal program guide demand mode for specifying a model among from a plurality of specific user models stored in the user model storing/applying unit 14 by using a character data for personal ID, and for displaying a program guide by the specified user model. On the contrary, there is a group user program guide demand mode for selecting user models having a predetermined number among from a plurality of specific user data stored in the user model storing/applying unit 14 by specifying from a user, for forming a group user model based on the selected plural user data (specific user model), and for displaying a program guide by the group user model.

Figure 30A:
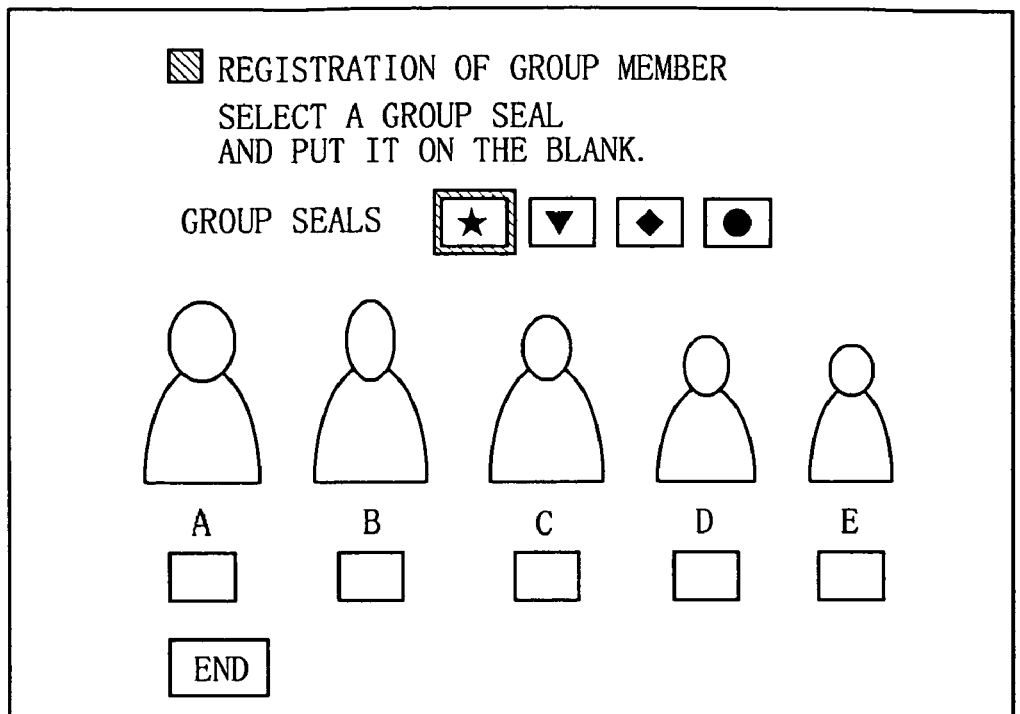
FIGS. 30A and 30B are schematic diagrams showing the picture display examples at the time of registering group member.
Figure 30B:
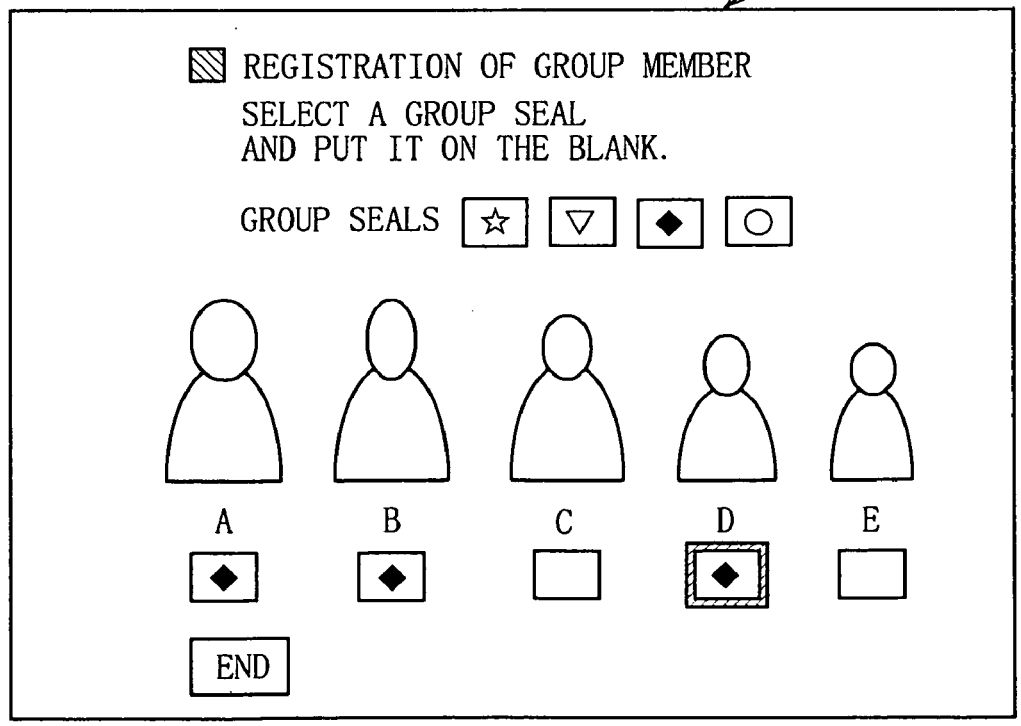
Figure 31:
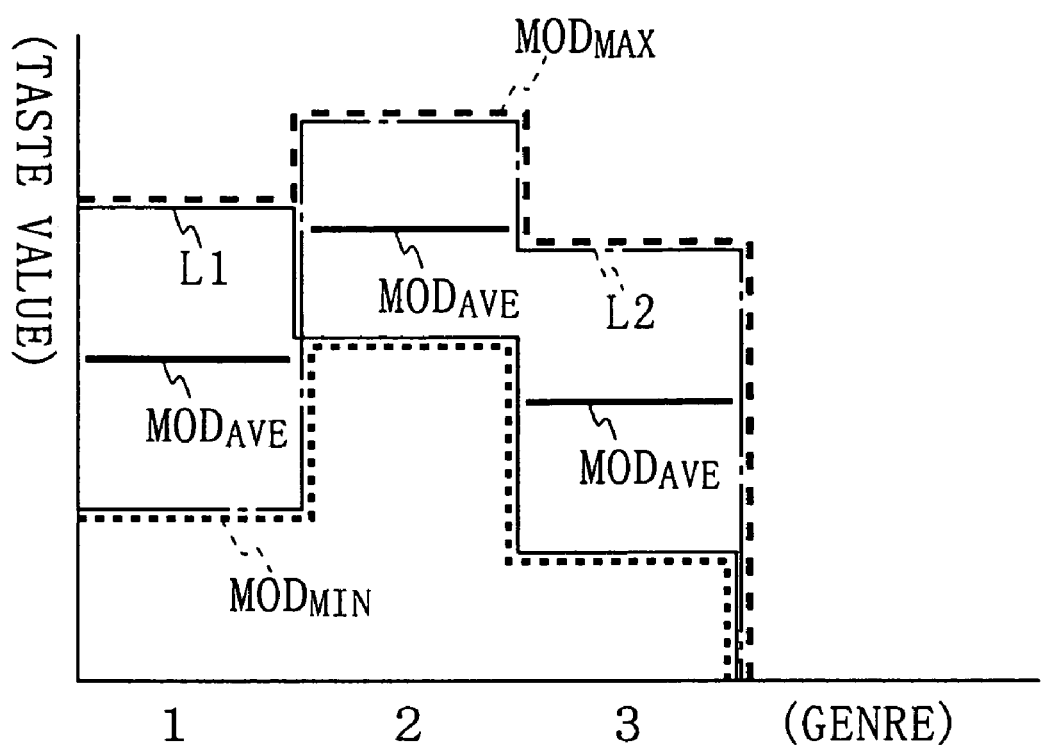
FIG. 31 is a characteristic curve diagram explaining the selection of a group user model forming mode.

A user operates the mode selection key K23 of the remote commander 5 to set the group user program guide demand mode, and the CPU 29 (FIG. 2) displays the group member registering picture shown in FIGS. 30A and 30B at this time. More specifically, an interactive picture shown in FIG. 30A is first displayed on the picture 4A of the monitor device 4. On this picture, a plurality of characters showing a personal ID are displayed together with corresponding symbols such as alphabets and so on. The user designates a symbol specifying a group name called group seal with a cursor, and determines it through the determination key K11 of the remote commander 5. Thereby, the cursor moves to the blank under each character, and the user transfers the cursor left and right to designate a character. The group seal designated by the cursor is assigned to the character designated by the cursor.

After assigning the group seal to one character, the cursor is transferred left and right to designate another character, and the same operation is repeated. Therefore, as shown in FIG. 30B, the same group seal can be assigned to a plurality of characters. In connection, the cursor is transferred again to the character to which a group seal has been once assigned to, and the determination key K11 is operated in this state, so as to erase a group seal once assigned.

The same group seal is assigned to a plurality of characters in this way, so as to set as one group the characters to which the same group seal is assigned. The group name is specified by the group seal data. The character data for personal ID of each specific user assigned to a group by group seal data is stored in the user model storing/applying unit 14 together with the group seal data representing the group name. Therefore, regarding the group model whose group has been once registered, the group name and the group user model forming mode described later are only inputted to display on a monitor a program guide corresponding to the group user model easily.

When the assignment of group seal has been completed, the user transfers a cursor to the end position (FIGS. 30A and 30B), and operates the determination key K11, so as to complete the registration of group user. The user model of each specific user corresponding to each character of which group registration has been completed in this way is respectively read out from the user model storing/applying unit 14 in accordance with the group registration, and outputted to the group user model forming unit 53 (FIG. 3).

When the registration of group user has been finished, a picture for selecting a group user model forming mode is then displayed on the monitor picture. On this picture, letters and/or figures representing maximum code, simple average mode, and minimum mode are displayed. A user can select and designate a desired mode by using a cursor.

Here, the group user forming mode is explained. As shown in FIGS. 30A and 30B, assuming that there is two specific user models constituting group user for example, a graph showing the taste value (audience rating) for each genre of the first user model is set to L1, and a graph showing the taste value (audience rating) for each genre of the second user model is set to L2. A mode constantly selecting the maximum value is called maximum mode and a mode constantly selecting the minimum value is called minimum mode in these taste values of two user model, and a mode constantly selecting the average value between two values is called simple average mode.

Accordingly, when the maximum mode is selected, the genre having the highest degree of taste is constantly selected among from the genres constituting the group user model and liked by each specific user. Also, when the minimum mode is selected, the genre having the lowest degree of taste is constantly selected among from the genres constituting the group user model and liked by each specific user. Further, when the simple average mode is selected, the genre having the average degree of taste is constantly selected among from the genres constituting the group user model and liked by each specific user.

Therefore, in the maximum mode, if one user of a plurality of specific users has a genre especially desired to be watched, the genre is selected. In the minimum mode, a genre such that nobody, among a plurality of specific users, complains is selected. Further, in the simple average mode, a genre liked by all of specific users somehow is selected.

In this way, the group user model forming unit 53 forms a priority order table of genre of the group user in the selected mode, and outputs this to the information filter unit 29, so as to rearrange the EPG data in accordance with the genre priority order data. Therefore, the program guide described above in FIG. 19 is displayed on the display picture 4A of the monitor device 4.

In connection, in the case where a program guide is formed using all of the specific user model stored in the user model storing/applying unit 14 as a group user, a user operates the family key K24 of the remote commander 5, so that the user model storing/applying unit 14 registers all user models as a group user, and forms a group user model from these models to display a program guide.

(4) The operation and effects of the embodiments

In the above-described construction, the general user model previously stored in the knowledge base unit 11 is obtained from the result that the television watching style of general users is analyzed, and is not always meet to a specific user as it is. Therefore, the specific user corrects the general user model based on the profile data of the specific user inputted from the user profile input unit 12, so as to form the specific user' own user model.

The data inputted as a specific user profile are age and sex of the specific user above-described in FIG. 21, life stage of the specific user above-described in FIG. 22, "attitude value of television audience" factor above-described in FIGS. 23A and 23B, and "attitude value of television audience" cluster above-described in FIG. 24. These data are the basic data of the specific user which will not be changed for a long period, such as basic taste and value of the specific user for television broadcasting or programs, and method and attitude of watching television.

Therefore, the specific user model formed by the profile data is a specific user's own basic model which will not be changed for a long period. The specific user models thus formed of a plurality of users are collected to form a group user model, so as to form a group model from models fitting to the basic characteristics of respective users constituting a group.

The priority order of program is determined by the group user model formed by composing the specific user's own basic models, so that a program is retrieved by a group user model which is not only the composition of the general users, but a group user model which has a group's own characteristics reflecting each user characteristics.

Thus, with the above constitution, a group's own characteristics is obtained based on respective user's own basic selection tastes, and the program priority order is determined, so that a user can easily obtain a program list on the basis of the own basic selection taste among from a huge amount of the programs.

(5) Other embodiments (5-1) The embodiment described above has been dealt with the case where the genres such as "news", "sports", "variety", "drama", "movie", "documentary", "music", "culture", and "program for children" are set as a program classification. However, this invention is not limited to this, but other classification can be set such as classifications according to other various genres, further detailed genres, or according to performer.

(5-2) The embodiment described above has been dealt with the case where the initial user model is formed based on the classification according to age and sex, life stage, attitude value factor, and attitude value cluster. However, this invention is not limited to this, but only one or two of these classifications is selected to form the initial user model.

(5-3) The embodiment described above has been dealt with the case where the dispersed data for every ten year are stored in the knowledge base unit 11 as age data and are linearly interpolated. However, instead of the linear interpolation, various interpolation calculation such as the trapezoid interpolation can be applied.

(5-4) The embodiment described above has been dealt with the case where as shown in FIG. 29, a plurality of program lists and the selected program list are displayed at the same time as display examples of the program list to be displayed on the monitor device 4. However, this invention is not only limited to this, but as shown in FIG. 32, only the selected program list can be displayed together with the explanation of the contents.

Figure 33:
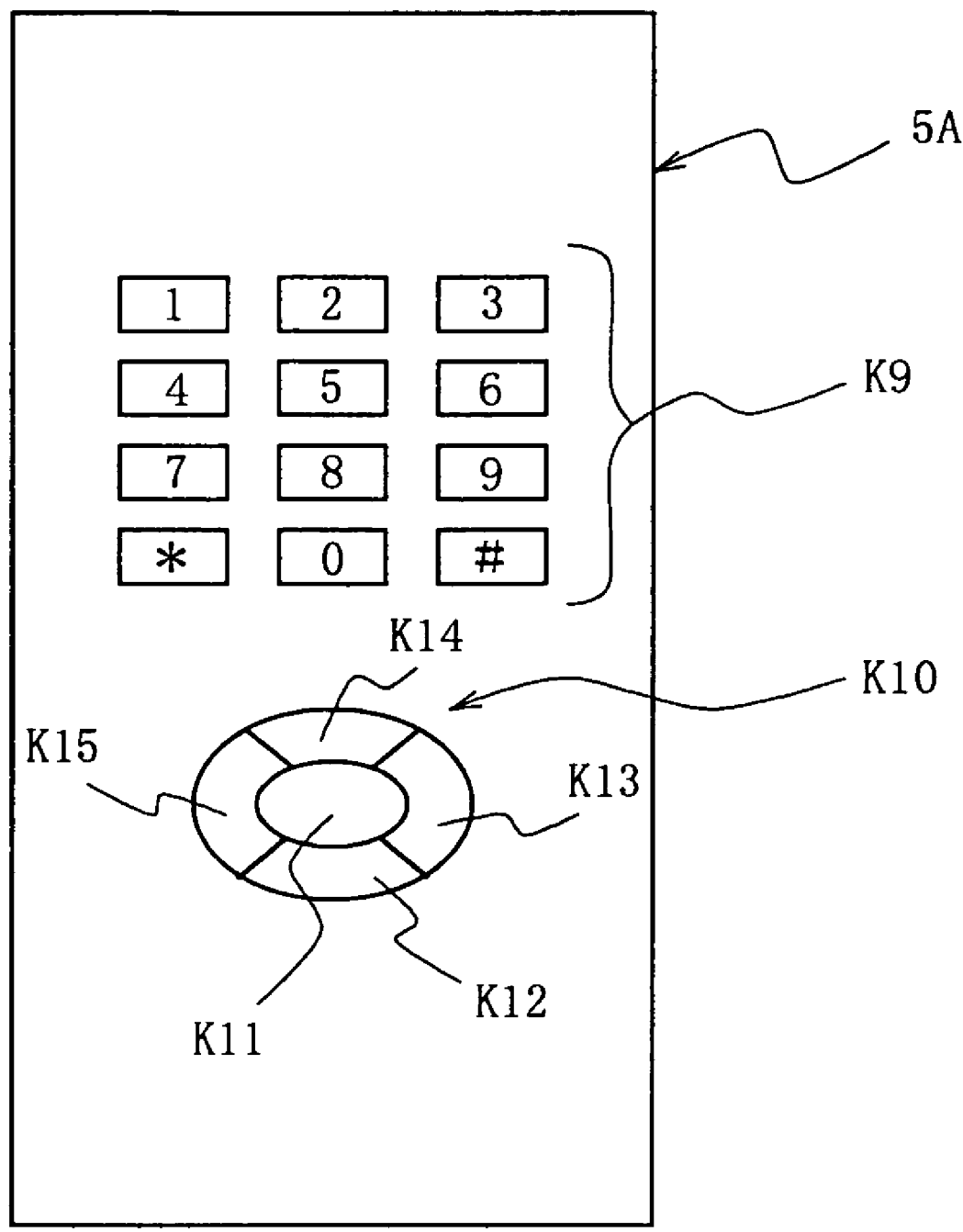
FIG. 33 is a plane diagram illustrating the arrangement of operation keys of a remote commander.

(5-5) The embodiment described above has been dealt with the case where a program guide is provided to a specific group like a family. However, this invention is not limited to this, but is applicable also in the case where a user registers to be a member at a public scene. More specifically, the user uses the remote commander 5A shown in FIG. 33 to register a member profile. The remote commander 5A has transfer keys K14, K11, K15, K13 for transferring a cursor on the monitor picture up, and, left, and right, a determination key K11 for determining an item specified by a cursor, and numeral/symbol key K9 for inputting numerals and symbols.

In this case, the member registration is performed by the same procedure as the profile registration procedure described above in FIG. 19. That is, when entering to the selection procedure of a character for personal ID at step SP3 of FIG. 19, the CPU 29 (FIG. 2) displays an interactive picture shown in FIG. 34 on the display picture 4A of the monitor device 4. In accordance with the picture, the user inputs the member number with the numeral/symbol key K9 of the remote commander 5A, and age and sex, and further a personal profile data of FIGS. 21 to 24 similarly to the input of a personal profile data. Thereby, the profile of the user is registered together with the member number.

In the case where thus registered specific users are collected to form a group model, a user first displays a menu on the monitor picture, and selects the items for groups registration. When the group registration is selected, an interactive picture shown in FIG. 35A is displayed on the monitor picture. The user registers ID number of group on the picture, and then inputs the member number of the user belonging on the group with the numeral/symbol key K9 successively. In this way, when the registration of a plurality of users is completed, the cursor is transferred to the end position and the determination key K11 is operated, so as to change the monitor picture into the picture shown in FIG. 35B.

The members of the registered group are displayed on the picture, and the user can confirm the list display. If there is an error in theist, the user transfers the cursor to the member number, and operates the determination key K11, so as to input the member number newly. Further, if there is no error, the user operates the determination key K11 as it is, so as to finish the group registration and confirmation processing.

Therefore, in a public scene where an unspecified number of the general public users exist, the group user model classified according to group ID can be formed easily with keeping a secret information.

(5-6) The embodiment described above has been dealt with the case where the specific user inputs his ID by using the remote commander 5 to request a program guide. However, this invention is not limited to this, but various check methods such as voice confirmation or finger-print check can be applied.

(5-7) The embodiment described above has been dealt with the case where the maximum mode, the minimum mode, and the simple average mode are set as the group user model forming mode. However, this invention is not limited to this, but various forming method can be applied such that a plurality of user models are weighted in accordance with life scene to form the group user model with the ratio depending on the weight.

(5-8) The embodiment described above has been dealt with the case where this invention is applied to an apparatus for retrieving digital broadcasting programs. However, this invention is not limited to this, but can be applied to various information retrieving apparatuses such as the retrieval of a huge amount of data by Internet, and the retrieval of package information of a mini disc (MD) and a digital video disc (DVD). In the case of applying the digital video disc device 8 and the mini disc device 9, the digital video disc (DVD) 8 and the mini disc (MD) 9 hold plural discs respectively, have a disc changer for selecting a disc in response to the specification from a user, store package information of each held disc (disc title and genre, etc.) in the SRAM 36 (FIG. 2) of the integrated receiver/decoder (IRD) via the control line, and selects a disc which suits the specific user among from the discs based on the user's own basic selection taste, similarly to the case described above in FIG. 3, to display a guide on the monitor picture. Therefore, the user selects a disc suiting himself from a list displayed on the monitor picture, and the control signal is outputted from the IRD 2 to the digital video disc device 8 or the mini disc 9 in accordance with this, and the fit disc is selected. In connection, the package information (disc title and genre) of each disc may be previously stored in each disc, and is read out by the disc changer, or the user may input the package information when each disc is loaded into the disc changer.

Also, in addition to the method of selecting a disc suiting the user among from a plurality of discs, all of the programs or music titles recorded in each disc have been previously stored in the SRAM 36 together with the genre, and the program or music title suiting the specific user can be retrieved. As a result, the disc in which the program or the music title selected by the user is recorded is selected.

Further, in the case of retrieving the Internet information, the Internet information (title relating to each home page or the genre) inputted through the communication line is stored in the SRAM 36, and the information based on the user's basic selection taste can be retrieved.

(5-9) The embodiment described above has been dealt with the case where the information retrieving device is provided in the satellite broadcasting receiver/decoder (IRD) 2. However, this invention is not limited to this, but in a system for controlling the IRD 2, VCRs 6, 7, DVD 8, and MD 9 from a software installed in a personal computer and the computer respectively, a system can be constructed such as to select a program or music title based on the user's basic selection taste by the personal computer. In this case, instead of the personal computer, an exclusive device (at least, which includes a information retrieving block shown in FIG. 3) can be provided.

According to the present invention, based on the plural user's own basic selection tastes, the priority order of the information is determined in the group constituting a plurality of users, so as to realize an information retrieval method and the apparatus which can retrieve the information desired by the group easily among from a huge among of programs.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An information retrieval method, comprising the steps of:
    forming a specific user's specific user model based on general user selection taste data comprising classification items and information contents on the basis of a general user group classified according to a user attribute and/or the state of information utilization, and based on the basic information selection taste data of said specific user;
    registering said specific user model formed for each of plural users so as to correspond to respective users;
    retrieving the information suiting one or more specific user model(s) based on said one or more specific user model(s) among a plurality of specific user models; and
    forming a group user model on the basis of said plurality of specific user models and retrieving information based on priority order tables located in the group user model,
    wherein said group user model is employed to retrieve information in accordance with one of a plurality of user-selectable modes,
    wherein said plurality of user-selectable modes includes a maximum value mode, a minimum value mode, and an average value mode,
    wherein retrieval based on the maximum value mode is based on one specific user model and retrieval based on the minimum value mode and the average value mode are based on each of said plurality of user-selectable modes,
    wherein, when the maximum value mode is selected, retrieval is a function of a highest preference of one user model among the plurality of specific use models,
    wherein, when the minimum value mode is selected, retrieval is a function of a number of complaints by the plurality of specific user models, and
    wherein a determination of the information retrieval method is based on the priority order tables.

2. The information retrieval method according to claim 1, further comprising the step of storing said group user model at an end user equipment and displaying a program menu at the end user equipment in a prioritized format according to the group user model stored at the end user equipment in accordance with a request from a user to retrieve said program menu.

3. The information retrieval method according to claim 2 wherein said program menu is an electronic program guide (EPG) which is displayed it said prioritized format via rearrangement of menu contents of the EPG in accordance with a genre priority order according to said selected group user model.

4. The information retrieval method according to claim 2 wherein said program menu is an electronic program guide (EPG) which is displayed in said prioritized from at via display of selected menu contents of the EPG in a differentiating manner with respect to non-selected menu contents displayed on a common screen, said selected menu contents being selected in accordance with said group user model.

5. The information retrieval method according to claim 1, wherein when said maximum value mode is selected, a genre having the highest degree of taste is continually selected from among a plurality of genres constituting the group user model and liked by each specific user of the group.

6. The information retrieval method according to claim 1, wherein when said minimum value mode is selected, at least a genre having at least the lowest degree of taste is continually selected from among the genres constituting the group user model and liked by each specific user.

7. The information retrieval method according to claim 1 wherein said group user model is formed exclusively on the basis of a plurality of specific user models formed for users of a common end user equipment of a household.

8. The information retrieval method according to claim 7 wherein said common end user equipment is television equipment.

9. An information retrieval apparatus, comprising:
    storing means for storing general user selection taste data comprising classification items and information contents on the basis of a general user group classified according to a user attribute and/or the state of information utilization;
    specific user model forming means for forming a specific user's own specific user model based on said general user selection taste data read out from said storing means and basic information selection taste data of said specific user;
    registering means for registering said specific user model formed for each of plural users so as to correspond to respective users, whereby a plurality of specific user models are registered;
    group user model forming means for forming a group user model on the basis of said plurality of specific user models registered by said registering means,
    wherein said group user model is employed to retrieve information in accordance with one of a plurality of user-selectable modes,
    wherein said plurality of user-selectable modes includes a maximum value mode, a minimum value mode, and an average value mode; and
    retrieving means for retrieving information based on priority order tables located in the group user model so that particular desired information from said group user model in accordance with said selected mode is provided;
    wherein retrieval based on the maximum value mode is based on one specific user model and retrieval based on the minimum value mode and the average value mode are based on each of said plurality of user-selectable modes,
    wherein, when the maximum value mode is selected, retrieval is a function of a highest preference of one user model among the plurality of specific user models,
    wherein, when the minimum value mode is selected, retrieval is a function of a number of complaints by the plurality of specific user models, and
    wherein a determined of an information retrieval method is based on the priority order tables.

10. The information retrieval apparatus according to claim 9, wherein:
    said information retrieval apparatus comprises group user model storing means, at common end user equipment, for storing said group user model; and
    said group user model is read out from said group user model storing means in accordance with a request from a user to retrieve said information.

11. The information retrieval apparatus according to claim 9, wherein said group user model forming means selects the maximum value of said plurality of specific user models to form a group user model.

12. The information retrieval apparatus according to claim 9, wherein said group users model forming means selects the minimum value of said plurality of specific user models to form a group user model.

13. An information retrieval method, comprising the steps of:
forming a specific user model for a specific user based at least upon the specific user's own selection data;
registering said specific user model formed for each of plural users, whereby a plurality of specific user models are registered and correspond to respective users; and
forming a group user model on the basis of said plurality of specific user models and retrieving information based on priority order tables located in the group user model;
wherein said group user model is employed to retrieve information in accordance with one of a plurality of user-selectable modes,
wherein said plurality of user-selectable modes includes a maximum value mode, a minimum value mode, and an average value mode.
wherein retrieval based on the maximum value mode is based on one specific user model and retrieval based on the minimum value mode and the average value mode are based on each of said plurality of user-selectable modes,
wherein, when the maximum value mode is selected, retrieval is a function of a highest preference of one user model among the plurality of specific user models,
wherein, when the minimum value mode is selected, retrieval is a function of a number of complaints by the plurality of specific user models, and
wherein a determination of the information retrieval method is based on the priority order tables.

14. A method for recommending one or more video programs meeting a group user preference, comprising:
enabling each user of a group of users of common end user equipment to input video program preference data;
processing the inputted program preference data to create a specific user model for each user in the group;
forming a group user model on the basis of said plurality of specific user models;
retrieving information based on priority order tables located in the group user model;
storing said formed group user model in a group user's preference database;
receiving program guide information;
determining one or more programs which may be of interest to a group user by use of said group user's preference database and said program guide information;
generating a display signal representing a prioritized screen which includes a list of said determined programs; and
selecting, via a user interface, a program from said displayed list for viewing;
wherein said group user model is employed to retrieve information in accordance with one of a plurality of user-selectable modes,
wherein said plurality of user-selectable modes includes a maximum value mode, a minimum value mode, and an average value mode; and
wherein retrieval based on the maximum value mode is based on one specific user model and retrieval based on the minimum value mode and the average value mode are based on each of said plurality of user-selectable modes,
wherein, when the maximum value mode is selected, retrieval is a function of a highest preference of one user model among the plurality of specific user models,
wherein, when the minimum value mode is selected, retrieval is a function of a number of complaints by the plurality of specific user models,
wherein a determination of an information retrieval method is based on the priority order tables.

15. The method according to claim 14 wherein said group user model is formed on the basis of said plurality of specific user models formed for users of said common end user equipment of a household.

16. The method according to claim 14 wherein said prioritized screen contains information of an electronic program guide (EPG), said information being displayed prioritized via rearrangement of menu contents of the EPG in accordance with a genre priority order according to said group user model.

17. The method according to claim 14 wherein said prioritized screen contains information of an electronic program guide (EPG), said information being displayed prioritized via display of selected menu contents of the EPG in a differentiating manner with respect to displayed non-selected menu contents on the screen, said selected menu contents being determined in accordance with said group user model.

18. Apparatus for recommending one or more video program meeting a group user preference, comprising:
a user interface for enabling each user of a group of users of common end user equipment to input video program preference data;
a processing unit for creating a specific user model for each user in the group;
a group user model forming part for forming a group user model on the basis of said plurality of specific user models;
a retrieving means for retrieving information based on priority order tables located in the group user model;
a group user's preference database for storing said formed group user model;
a determination part for determining one or more programs which may be of interest to a group user for use of said group user's preference database and program guide information; and
a display processor for generating a display signal representing a prioritized screen which includes a list of said determined programs;
wherein said user interface enables said group user to select a program from said displayed list for viewing; and
said group user model is employed to retrieve information in accordance with one of a plurality of user-selectable modes,
wherein said plurality of user-selectable modes includes a maximum value mode, a minimum value mode, and an average value mode,
wherein retrieval based on the maximum value mode is based on one specific user model and retrieval based on the minimum value mode and the average value mode are based on each of said plurality of user-selectable modes,
wherein, when the maximum value mode is selected, retrieval is a function of a highest preference of one user model among the plurality of specific user models,
wherein, when the minimum value mode is selected, retrieval is a function of a number of complaints by the plurality of specific user models, and wherein a determination of an information retrieval methods is based on the priority order tables.

19. The apparatus according to claim 18 wherein said group user model is formed on the basis of said plurality of specific user models formed for users of said common end user equipment of a household.

20. The apparatus according to claim 18 wherein said prioritized screen contains information of an electronic program guide (EPG), said information being displayed prioritized via rearrangement of menu contents of the EPG in accordance with a genre priority order according to said group user model.

21. The apparatus according to claim 18 wherein said prioritized screen contains information of an electronic program guide (EPG), said information being displayed prioritized via display of selected menu contents of the EPG in a differentiating manner with respect to displayed non-selected menu contents on the screen, said selected menu contents being determined in accordance with said group user model.

* * * * *